US008596358B2

(12) United States Patent
Kotlar et al.

(10) Patent No.: US 8,596,358 B2
(45) Date of Patent: Dec. 3, 2013

(54) WELL TREATMENT

(75) Inventors: Hans Kristian Kotlar, Stavanger (NO);
Frode Haavind, Stavanger (NO)

(73) Assignee: Statoil ASA, Stavanger (NO)

( * ) Notice: Subject to any disclaimer, the term of this patent is extended or adjusted under 35 U.S.C. 154(b) by 381 days.

(21) Appl. No.: 11/629,729

(22) PCT Filed: Jun. 17, 2005

(86) PCT No.: PCT/GB2005/002390
§ 371 (c)(1),
(2), (4) Date: Apr. 23, 2007

(87) PCT Pub. No.: WO2005/124100
PCT Pub. Date: Dec. 29, 2005

(65) Prior Publication Data
US 2007/0204990 A1 Sep. 6, 2007

(30) Foreign Application Priority Data

Jun. 17, 2004 (GB) .................................. 0413584.4
Oct. 29, 2004 (GB) .................................. 0424085.9

(51) Int. Cl.
*E21B 43/02* (2006.01)
*E21B 43/26* (2006.01)

(52) U.S. Cl.
USPC .................................... 166/276; 166/305.1

(58) Field of Classification Search
None
See application file for complete search history.

(56) References Cited

U.S. PATENT DOCUMENTS

| 2,633,919 | A |   | 4/1953  | Bauer et al. ................... 166/21 |
| 2,832,754 | A | * | 4/1958  | Jex et al. ...................... 528/38 |
| 2,935,475 | A |   | 5/1960  | Bernard ..................... 252/8.55 |
| 2,939,839 | A |   | 6/1960  | Brukner .................... 252/8.55 |
| 2,975,835 | A |   | 3/1961  | Bond |
| 3,185,216 | A |   | 5/1965  | Hitzman ....................... 166/42 |
| 3,199,587 | A |   | 8/1965  | Santourian ..................... 166/9 |
| 3,199,590 | A |   | 8/1965  | Young ........................ 166/295 |
| 3,250,330 | A | * | 5/1966  | Smith, Jr. ..................... 166/295 |
| 3,286,770 | A |   | 11/1966 | Knox et at ..................... 166/42 |
| 3,294,166 | A | * | 12/1966 | Havenaar et al. ............. 166/295 |
| 3,364,994 | A | * | 1/1968  | Sterrett ..................... 166/270.2 |
| 3,552,493 | A |   | 1/1971  | Bezemer ..................... 166/295 |
| 3,625,287 | A | * | 12/1971 | Young ........................ 166/295 |
| 4,074,536 | A |   | 2/1978  | Young .......................... 61/36 |
| 4,120,842 | A |   | 10/1978 | Harnsberger ................ 260/33.6 |
| 4,384,044 | A |   | 5/1983  | Kim et al. |
| 4,417,623 | A |   | 11/1983 | Anthony ..................... 166/294 |
| 4,450,908 | A |   | 5/1984  | Hitzman ..................... 166/246 |
| 4,479,543 | A | * | 10/1984 | Kalfayan et al. .............. 166/300 |
| 4,498,538 | A |   | 2/1985  | Watkins et al. ............... 166/295 |
| 4,506,044 | A |   | 3/1985  | Cox et al. |
| 4,530,956 | A |   | 7/1985  | Ugelstad et al. |
| 4,549,609 | A |   | 10/1985 | Watkins et al. ................ 166/303 |
| 4,580,633 | A |   | 4/1986  | Watkins et al. ................ 166/295 |
| 4,646,835 | A |   | 3/1987  | Watkins et al. ................ 166/295 |
| 4,660,642 | A |   | 4/1987  | Young .......................... 166/280.2 |
| 4,689,085 | A |   | 8/1987  | Plueddemann ........... 106/287.14 |
| 4,708,207 | A |   | 11/1987 | Kalfayan et al. ............... 166/295 |
| 4,743,545 | A |   | 5/1988  | Torobin |
| 4,787,453 | A | * | 11/1988 | Hewgill et al. ............. 166/272.3 |
| 4,846,981 | A |   | 7/1989  | Brost |
| 4,850,745 | A |   | 7/1989  | Hater et al. |
| 4,905,761 | A |   | 3/1990  | Bryant |
| 4,938,287 | A |   | 7/1990  | Friedman et al. ............. 166/288 |
| 5,043,364 | A |   | 8/1991  | Moradi-Araghi et al. .... 523/130 |
| 5,083,611 | A |   | 1/1992  | Clark et al. |
| 5,129,458 | A |   | 7/1992  | King et al. .................... 166/295 |
| 5,163,510 | A |   | 11/1992 | Sunde |
| 5,169,561 | A |   | 12/1992 | Gentle et al. .................. 252/321 |
| 5,250,201 | A |   | 10/1993 | Shilo et al. |
| 5,297,625 | A |   | 3/1994  | Premuzic et al. |
| 5,337,820 | A |   | 8/1994  | Jenneman et al. |
| 5,376,183 | A |   | 12/1994 | Gatt et al. |
| 5,379,841 | A |   | 1/1995  | Pusch et al. .................... 166/295 |
| 5,492,828 | A |   | 2/1996  | Premuzic .................... 435/245 |
| 5,530,095 | A |   | 6/1996  | Vaughn et al. |
| 5,701,956 | A |   | 12/1997 | Hardy et al. .................. 166/295 |
| 5,735,349 | A |   | 4/1998  | Dawson et al. |
| 5,806,593 | A |   | 9/1998  | Surles .......................... 166/270 |
| 6,024,791 | A |   | 2/2000  | Sonoda et al. ................ 106/714 |
| 6,169,058 | B1 |  | 1/2001  | Le et al. ....................... 507/222 |
| 6,210,476 | B1 |  | 4/2001  | Chatterji et al. .............. 106/677 |
| 6,228,812 | B1 |  | 5/2001  | Dawson et al. ............... 507/221 |
| 6,401,819 | B1 |  | 6/2002  | Harris et al. |
| 6,474,413 | B1 |  | 11/2002 | Barbosa et al. ............... 166/270 |
| 6,476,169 | B1 |  | 11/2002 | Eoff et al. .................. 526/307.2 |
| 6,543,535 | B2 |  | 4/2003  | Converse et al. ............. 166/246 |
| 6,702,044 | B2 |  | 3/2004  | Reddy et al. .................... 175/64 |
| 7,325,603 | B2 |  | 2/2008  | Kotlar |
| 7,922,893 | B2 |  | 4/2011  | Busche et al. .................. 208/46 |
| 7,964,539 | B2 |  | 6/2011  | Kotlar .......................... 507/233 |
| 8,210,261 | B2 |  | 7/2012  | Godøy et al. ................. 166/292 |
| 2002/0104651 | A1 | | 8/2002 | McClung |
| 2002/0123433 | A1 | | 9/2002 | Goodhue, Jr. et al. ........ 507/140 |
| 2003/0131764 | A1 | | 7/2003 | Lessard et al. ................ 106/817 |
| 2003/0216263 | A1 | | 11/2003 | Tibbles et al. |
| 2004/0177957 | A1 | | 9/2004 | Kalfayan et al. .............. 166/270 |
| 2005/0173116 | A1 | | 8/2005 | Nguyen et al. ............. 166/280.2 |
| 2007/0158070 | A1 | * | 7/2007 | Endres et al. ................. 166/294 |

FOREIGN PATENT DOCUMENTS

| AU | 2005254780 | 6/2005 |
| AU | 2005254781 | 6/2005 |

(Continued)

OTHER PUBLICATIONS

Research Disclosure Journal, "Method for the consolidation of incompetent formations," Anonymously Disclosed, Jan. 1995.

(Continued)

*Primary Examiner* — Angela M DiTrani
(74) *Attorney, Agent, or Firm* — Ballard Spahr LLP

(57) ABSTRACT

The present invention provides a method for the treatment of a subterranean formation which contains sand particles, said method comprising contacting said formation with a material capable of increasing the residual matrix strength of said particulate fine whereby to reduce or prevent their migration while minimizing any decrease in their permeability. Preferred materials include organosilanes and enzyme systems.

20 Claims, 9 Drawing Sheets

(56) References Cited

FOREIGN PATENT DOCUMENTS

| | | |
|---|---|---|
| AU | 2006238942 | 4/2006 |
| CA | 2569770 | 6/2005 |
| CA | 2569782 | 6/2005 |
| CA | 2604220 | 4/2006 |
| CN | 1420254 | 5/2003 |
| CN | 1472157 | 2/2004 |
| CN | 200680014248.7 | 4/2006 |
| EA | 200602213 | 6/2005 |
| EA | 200602214 | 6/2005 |
| EA | 200702078 | 4/2006 |
| EP | 0 003 905 | 9/1979 |
| EP | 0 224346 | 3/1986 |
| EP | 0 187 092 | 7/1986 |
| EP | 0 193 369 | 9/1986 |
| EP | 0 265563 | 10/1986 |
| EP | 0 266043 | 4/1988 |
| EP | 0 365 390 | 4/1990 |
| EP | 0 656 459 | 6/1995 |
| EP | 0 692 464 | 1/1996 |
| EP | 1 235 974 | 1/2005 |
| EP | 2006726911 | 4/2006 |
| GB | 1 021528 | 3/1966 |
| GB | 1 022742 | 3/1966 |
| GB | 1 511589 | 5/1978 |
| GB | 2 222 420 | 3/1990 |
| GB | 2 290 096 | 12/1995 |
| GB | 0112343.9 | 5/2001 |
| GB | 2 377 930 | 1/2003 |
| GB | 2 387 613 | 10/2003 |
| GB | 0329038.4 | 12/2003 |
| GB | 0413584.4 | 6/2004 |
| GB | 2 399 364 | 9/2004 |
| GB | 0424085.9 | 10/2004 |
| GB | 0502171.2 | 2/2005 |
| GB | 508420.7 | 4/2005 |
| GB | 520981.2 | 10/2005 |
| GB | 2 425 531 | 11/2006 |
| GB | 0712395.3 | 6/2007 |
| GB | 0716784.4 | 8/2007 |
| JP | 720330488 * | 8/1972 |
| KR | 20020044733 | 6/2002 |
| KR | 20030071279 | 9/2003 |
| MX | MX/a/2007/013262 | 4/2006 |
| SU | 1025868 | 6/1983 |
| SU | 1661379 | 7/1991 |
| WO | WO 88/00948 | 2/1988 |
| WO | WO 92/17413 | 10/1992 |
| WO | WO 96/27070 | 9/1996 |
| WO | WO 97/45625 | 12/1997 |
| WO | WO98/27314 | 6/1998 |
| WO | WO 99/03666 | 1/1999 |
| WO | WO 99/19375 | 4/1999 |
| WO | WO 99/54592 | 10/1999 |
| WO | WO 01/34939 | 5/2001 |
| WO | PCT/GB02/02359 | 5/2002 |
| WO | WO 02/095187 | 11/2002 |
| WO | WO 03/010107 | 2/2003 |
| WO | WO 03/087010 | 10/2003 |
| WO | WO 2005/005773 | 1/2005 |
| WO | WO 2005/073278 | 2/2005 |
| WO | WO 2005/024175 | 3/2005 |
| WO | PCT/GB2005/002385 | 6/2005 |
| WO | PCT/GB2005/02390 | 6/2005 |
| WO | WO 2005/124099 | 12/2005 |
| WO | WO 2005/124100 | 12/2005 |
| WO | PCT/GB2006/001524 | 4/2006 |
| WO | WO 2006/114623 | 11/2006 |
| WO | WO 2006/118467 | 11/2006 |
| WO | WO 2007/033489 | 3/2007 |
| WO | PCT/GB2008/002209 | 6/2008 |
| WO | PCT/GB2008/002912 | 8/2008 |
| WO | WO 2009/001098 | 12/2008 |
| WO | WO 2009/027680 | 3/2009 |

OTHER PUBLICATIONS

International Search Report for International Application No. PCT/GB2005/002385 (mailed Nov. 18, 2005).
International Preliminary Report on Patentability for International Application No. PCT/GB2005/002385 (completed Apr. 3, 2006).
Written Opinion for International Application No. PCT/GB2005/002385 (mailed Nov. 18, 2005).
International Search Report for International Application No. PCT/GB2005/002390 (mailed Nov. 18, 2005).
International Preliminary Report on Patentability for International Application No. PCT/GB2005/002390 (completed May 30, 2006).
Written Opinion for International Application No. PCT/GB2005/002390 (mailed Nov. 18, 2005).
International Preliminary Report on Patentability for International Patent Application No. PCT/GB2006/001524 (issued Oct. 30, 2007).
International Search Report for International Patent Application No. PCT/GB2006/001524 (mailed Oct. 13, 2006).
International Search Report for International Patent Application No. PCT/GB2008/002912 (mailed Dec. 8, 2008).
Lea, *The Chemistry of Cement and Concrete* 31, 121, 132, 416, 560, 621, 657 (3d ed. 1970).
Saasen, et al., "The Use of Blast Furnace Slag in North Sea Cementing Applications," SPE28821, pp. 143-153, Proceedings, European Petroleum Conference, London, UK (Oct. 25-27, 1994).
Written Opinion for International Patent Application No. PCT/GB2006/001524 (mailed Oct. 13, 2006).
Cannio et al. (1998) An autonomously replicating transforming vector for Sulfolobus solfataricus. J. Bacteriol., 180(12): 3237-3240.
Collins IR. Scale Inhibition by Poly(amino acids). Shared Petrotechnical Resource, Chertsey Road, Sunbury-on-Thames, Middlesex T16 7LN.
Ornek et al. (2002) Pitting corrosion inhibition of aluminum 2024 by *Bacillius* biofilms secreting polyaspartate or gamma-polyglutamate. Appl. Microbiol, Biotechnol., 58(5): 651-657.
McGovern-Traa et al. (1997) Petroleum Geology of the Irish Sea and Adjacent areas. Geological Society Special publication, 124: 229-236.
Search Report issued on Oct. 26, 2009 for EA 200802357, which was filed on Jun. 17, 2005 (Applicant—Statoil Asa; Inventor—Kotlar et al. ).
Summary of Examiner Interview issued Nov. 24, 2010 in U.S. Appl. No. 11/629,636, filed Jun. 17, 2005 (Inventors: H.K. Kotlar).
Response after Final Office Action filed Nov. 19, 2010 in U.S. Appl. No. 11/629,636, filed Jun. 17, 2005 (Inventors: H.K. Kotlar).
Final Office Action issued Jul. 23, 2010 in U.S. Appl. No. 11/629,636, filed Jun. 17, 2005 (Inventors: H.K. Kotlar).
Response after Non-Final Office Action filed Apr. 23, 2010 in U.S. Appl. No. 11/629,636, filed Jun. 17, 2005 (Inventors: H.K. Kotlar).
Non-Final Office Action issued Oct. 23, 2009 in U.S. Appl. No. 11/629,636, filed Jun. 17, 2005 (Inventors: H.K. Kotlar).
Response after Non-Final Action filed Nov. 29, 2010 in U.S. Appl. No. 11/919,367, filed Apr. 26, 2006 (Inventors: Godoy et al.).
Non-Final Rejection issued May 27, 2010 in U.S. Appl. No. 11/919,367, filed Apr. 26, 2006 (Inventors: Godoy et al.).
First Office Action issued Dec. 18, 2000 for CN 200680014248.7 (Applicant—Statoilhydro Asa; Inventor—Godoy et al.).
International Preliminary Report on Patentability issued on Mar. 2, 2010 for PCT/GB2008/002912, which was filed on Aug. 29, 2008 and published as Mar. 5, 2009 on WO 2009/027680 (Applicant—Statoilhydro Asa; Inventors: Kotlar et al).
Written Opinion issued on Feb. 28, 2008 for PCT/GB2008/002912, which was filed on Aug. 29, 2008 and published as Mar. 5, 2009 on WO 2009/027680 (Applicant—Statoilhydro Asa; Inventors: Kotlar et al).
Restriction Requirement issued Dec. 27, 2010 in U.S. Appl. No. 12/452,259, filed Jun. 26, 2008 (Inventors: H.K. Kotlar).
Preliminary Amendment filed Dec. 22, 2009 in U.S. Appl. No. 12/452,259, filed Jun. 26, 2008 (Inventors: H.K. Kotlar).
International Search Report issued Mar. 4, 2009 for PCT/GB2008/002209, which was filed on Jun. 26, 2008 and published as WO 2009/001098 on Dec. 31, 2008 (Inventor—H.K. Kotlar; Applicant Statoilhydro Asa).

(56) References Cited

OTHER PUBLICATIONS

International Preliminary Report on Patentability issued Jun. 24, 2009 for PCT/GB2008/002209, which was filed on Jun. 26, 2008 and published as WO 2009/001098 on Dec. 31, 2008 (Inventor—H.K. Kotlar; Applicant Statoilhydro ASA).
Written Opinion issued Dec. 29, 2009 for PCT/GB2008/002209, which was filed on Jun. 26, 2008 and published as WO 2009/001098 on Dec. 31, 2008 (Inventor—H.K. Kotlar; Applicant Statoilhydro Asa).
Issue Notification issued Jan. 16, 2008 in U.S. Appl. No. 10/478,776, filed May 24, 2002 (Inventors: Kotlar et al.).
Notice of Allowance issued Nov. 30, 2007 in U.S. Appl. No. 10/478,776, filed May 24, 2002 (Inventors: Kotlar et al.).
Notice of Allowance issued Aug. 30, 2007 in U.S. Appl. No. 10/478,776, filed May 24, 2002 (Inventors: Kotlar et al.).
Amendment and Response to Office Action filed Jul. 10, 2007 in U.S. Appl. No. 10/478,776, filed May 24, 2002 (Inventors: Kotlar et al.).
Non-Final Office Action issued Jan. 12, 2007 in U.S. Appl. No. 10/478,776, filed May 24, 2002 (Inventors: Kotlar et al.).
Amendment and Response to Office Action filed Dec. 22, 2006 in U.S. Appl. No. 10/478,776, filed May 24, 2002 (Inventors: Kotlar et al.).
Final Office Action issued Jun. 23, 2006 in U.S. Appl. No. 10/478,776, filed May 24, 2002 (Inventors: Kotlar et al.).
Amendment and Response to Office Action filed Mar. 27, 2006 in U.S. Appl. No. 10/478,776, filed May 24, 2002 (Inventors: Kotlar et al.).
Non-Final Office Action issued Sep. 27, 2006 in U.S. Appl. No. 10/478,776, filed May 24, 2002 (Inventors: Kotlar et al.).
Preliminary Amendment filed Nov. 22, 2003 in U.S. Appl. No. 10/478,776, filed May 24, 2002 (Inventors: Kotlar et al.).
Search Report issued on Oct. 1, 2007 for GB 0712395.3, which claims priority to PCT/GB2008/002209, which was filed on 06/26/08 (Inventors: H.K. Kotlar).
Non-Final Rejection issued Feb. 16, 2011 in U.S. Appl. No. 11/919,367, filed Apr. 26, 2006 (Inventors: Godoy et al.).
Response to Non-Final Rejection filed Jul. 18, 2011 in U.S. Appl. No. 11/919,367, filed Apr. 26, 2006 (Inventors: Godoy et al.).
Notice of Allowance issued Oct. 26, 2011 in U.S. Appl. No. 11/919,367, filed Apr. 26, 2006 (Inventors: Godoy et al.).
Response to Restriction Requirement filed Feb. 23, 2011 in U.S. Appl. No. 12/452,259, filed Jun. 26, 2008 (Inventors: H.K. Kotlar).
Non-Final Rejection issued Mar. 3, 2011 in U.S. Appl. No. 12/452,259, filed Jun. 26, 2008 (Inventors: H.K. Kotlar).
Response to Non-Final Rejection filed Sep. 6, 2011 in U.S. Appl. No. 12/452,259, filed Jun. 26, 2008 (Inventors: H.K. Kotlar).
Supplemental Response to Non-Final Rejection filed Sep. 26, 2011 in U.S. Appl. No. 12/452,259, filed Jun. 26, 2008 (Inventors: H.K. Kotlar).
Non-Final Rejection issued Nov. 2, 2011 in U.S. Appl. No. 12/452,259, filed Jun. 26, 2008 (Inventors: H.K. Kotlar).
Notice of Allowance issued Feb. 2, 2011 in U.S. Appl. No. 11/629,636, filed Jun. 17, 2005 (Inventors: H.K. Kotlar).
Issue Fee Transmittal filed May 10, 2011 in U.S. Appl. No. 11/629,636, filed Jun. 17, 2005 (Inventors: H.K. Kotlar).
Issue Notification issued Jun. 1, 2011 in U.S. Appl. No. 11/629,636, filed Jun. 17, 2005 (Inventors: H.K. Kotlar).
"Expanding Heavy Oil Bitumen Resources while Mitigating GHG Emissions and Increasing Sustainability," Prepared by Petroleum Technology Alliance Canada [May 31, 2006].
Amendment and Response to Final Office Action filed on Dec. 27, 2012 for U.S. Appl. No. 12/452,259, filed Mar. 19, 2010 [Inventor—Kotlar; Applicant—Statoil ASA;] [9 pages].
Response to Non-Final Rejection filed Apr. 2, 2012 in U.S. Appl. No. 12/452,259, filed Mar. 19, 2010 (Inventors: Godoy et al.,).
Non-Final Rejection issued May 9, 2012 in U.S. Appl. No. 12/452,259, filed Mar. 19, 2010 (Inventors: H.K. Kotlar).
Notice of Allowance issued Mar. 2, 2012 in U.S. Appl. No. 11/919,367, filed Jun. 29, 2008 (Inventors: Gotoy).
Final Office Action issued Aug. 29, 2012 for U.S. Appl. No. 12/452,259, filed Mar. 19, 2010 (Inventor—Kotlar; Applicant—Statoil ASA) (pp. 1-7).
Response to Non-Final Rejection filed Aug. 9, 2012 in U.S. Appl. No. 12/452,259, filed Mar. 19, 2010 (Inventors: Godoy et al.).
Issue Notification issued on Jun. 13, 2012, in U.S. Appl. No. 11/919,367, filed on Apr. 26, 2006 (Inventors: Godoy et al.).

* cited by examiner

WELL TREATMENT

CROSS REFERENCE TO RELATED APPLICATIONS

The present application claims priority to International Application No. PCT/GB2005/002390, filed Jun. 17, 2005, which International Application claims priority to Great Britain Application No. 0413584.4, filed Jun. 17, 2004, and Great Britain Application No. 0424085.9, filed Oct. 29, 2004, which applications are incorporated herein fully by this reference.

This invention relates to a method of maintaining or enhancing fluid flow through subterranean formations, especially formations which comprise sand particles. More particularly, the invention relates to the prevention or reduction of particle (e.g. sand) migration in hydrocarbon-producing formations. Yet more particularly, the invention concerns the consolidation or strengthening of unconsolidated sand-like materials (especially sand) in subterranean formations.

Hydrocarbons (i.e. oil or gas) are recovered from subterranean formations by drilling a well bore into the formation and extracting the hydrocarbon. One of the factors which influences the rate of hydrocarbon production is the permeability of the formation which depends on the size of its pores and internal capillaries.

Subterranean formations may typically comprise sandstone in which sand particles are closely packed together. These close packed particles form the basic structure of the formation (e.g. the sand particles may comprise greater than 75%, preferably greater than 85%, e.g. greater than 95% by weight of the formation). Also present in subterranean formations are small particulates (so-called "fines") which may comprise sand and other fine particulate matter (e.g. quartz, clays, etc). These "fines" occupy the pores or interstitial spaces formed by the close packing of sand particles.

When recovering hydrocarbons from subterranean formations containing particulate fines, such as silt-sized or smaller particles, these very fine particles have a tendency to be dislodged (e.g. due to instability of the formation). Where a large volume of fluid is forced to flow through such a formation, not only these particulates but also sand particles which comprise the structure of the formation, may be transported to the surface and must then be disposed of. Disposal of large volumes of sand produced from unconsolidated or poorly consolidated formations presents serious problems in terms of the logistics of disposal and also has a huge impact on the economics of the oil and/or gas recovery process. Erosion of downhole equipment (e.g. pipelines, valves, etc.) due to the high velocities of particulates, and especially sand particles, can also occur. Routine repair or replacement of such equipment can only be carried out during periods of shut-down in production which, again, has a significant economic impact on the production process. Fine particulates, and in particular, sand particles can also become lodged in capillaries or a pore throat (i.e. the smaller interstices between the grains of the formation). This at least partially plugs the pore spaces thereby causing a reduction in permeability of the formation and hence a reduction in the rate of hydrocarbon (e.g. oil) production.

Permeability impairment due to the production and movement of fine particulates, and especially sand particles, is a major problem in the operation of hydrocarbon-producing wells, particularly those located within very weak or unconsolidated formations. The result is usually lost production due to plugging of gravel packs, screens, perforations, tubular and surface flow lines or separators. In addition to damaging pumps or other downhole equipment, erosion of casing and surface facilities may also occur. This is a major problem associated with sand mobilization. Indeed, sanding problems can in some cases cause loss or recompletion of a well due to casing and/or hole collapse. As operating conditions become more severe and the costs associated with well failure escalate so the need for effective sand control increases.

A number of methods for controlling sand production have been proposed. These include gravel packing, sand consolidation, critical production rate, oriented/selective perforation, FracPacking, and various combinations of these methods. Such techniques are used in consolidated, poorly consolidated and unconsolidated sand formations.

Another approach to the problem of sanding is to operate the well under conditions not subject to failure. This is commonly termed "Maximum Sand-Free" production. During operation this technique is implemented by gradually increasing the production rate until sand production starts. The rate is then decreased until sanding stops and production is maintained at that level. The difficulty with this approach, however, is that formations tend to become less stable with time. Through pressure depletion and water in-flow, the maximum sand-free rate will usually decrease with time until production becomes uneconomic.

Chemical treatments have also been proposed which involve strengthening a formation by injecting a chemical that bonds fine particulates and/or sand grains together. Chemical agents which have been used in sand consolidation include furaldehydes, phenols and epoxy-based systems; however, these are not considered to be environmentally friendly. A further drawback to these systems is that these have a tendency to block the pores of the formation thereby reducing its permeability to both oil and water. This results in a dramatic reduction in the production rate. There has therefore been a widespread belief amongst those skilled in the art that chemical treatment should be avoided.

There is thus a continuing need for alternative (e.g. improved) well treatments which are able to prevent or reduce the production and movement of fine particles, and especially sand particles, during operation of the well, in particular treatments which minimise the reduction in permeability that can occur when a fluid passes through a formation which comprises sand particles and which may also contain additional moveable fine particles.

To date, chemical treatments proposed for use in preventing particulate migration, especially those for use in sand consolidation, have focused on the need to form relatively strong chemical and/or physical bonds between the sand particles. This need arises from the misconception that a certain minimum strength has to be imparted to the formation in order to prevent the movement of fine particulates and sand particles. This, however, results in the formation of stone or stone-like structures in which the interstices or pores between the particles of the formation become blocked and which therefore have low or zero permeability thereby further reducing production levels.

Figure 1:
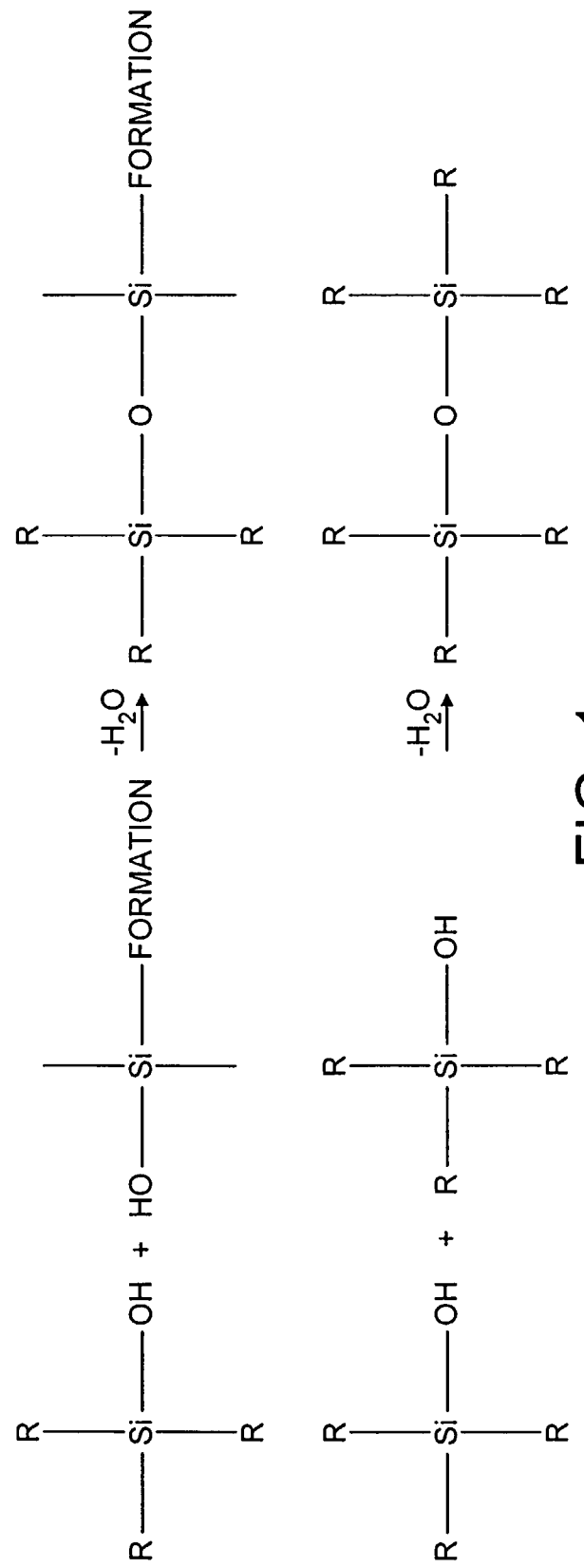
FIG. 1 shows the chemical reaction between active sites of a formation and a silanol molecule (top) and the chemical reaction between two silanol molecules (bottom).

Surprisingly, we have now found that the production of fine particulates and, in particular, sand production can be adequately controlled by the use of chemical agents which impart small incremental forces or a relatively weak residual strength to the formation. Such agents are capable of imparting sufficient resistance against sand particle mobilization but without unduly reducing the permeability of the formation after treatment, e.g. whilst maintaining a high level of permeability. In this way, the production rate can be increased without increasing the production of fine particulates and/or sand particles. Furthermore, since the demand for strength in the particles of the formation matrix is low, this opens up the possibility of using different chemicals for the prevention or reduction of particle migration in rock formations (e.g. for sand consolidation), in addition to the possibility of using chemicals previously proposed for use in preventing particle migration but in much lower amounts. Production costs may therefore be significantly reduced and, if required, sand consolidation may be carried out more frequently thereby still further improving production levels.

Viewed from one aspect the present invention thus provides a method for the treatment of a subterranean formation which contains sand particles, said method comprising contacting said formation with a material capable of increasing the residual matrix strength of said sand particles whereby to reduce or prevent their migration whilst minimising any decrease in the permeability of the formation. In a preferred method of the invention, said material is also capable of increasing the residual matrix strength of particulate fines whereby to reduce or prevent their migration whilst minimising any decrease in the permeability of the formation.

Viewed from another aspect the invention provides the use for the manufacture of hydrocarbon well treatment compositions (e.g. sand consolidation compositions) of a material capable of increasing the residual matrix strength of sand particles contained within a subterranean formation whereby to reduce or prevent their migration whilst minimising any decrease in the permeability of said formation.

Viewed from a still further aspect the invention comprises a hydrocarbon well treatment composition (e.g. a sand consolidation composition) comprising a carrier liquid containing a material capable of increasing the residual matrix strength of sand particles contained within a subterranean formation whereby to reduce or prevent their migration whilst minimising any decrease in the permeability of said formation.

For the present purposes, the term "sand particles" encompasses any siliceous material which comprises the structure of a subterranean formation. The terms "fines", "fine particulates" and "particulate fines" are intended to encompass any particles present in the pores or interstitial spaces present in the formation. These latter particles typically have a mean particle diameter of <50 μm. Typically, these will be small enough to pass through the openings of the smallest sieve commonly available (approx. 37 μm openings). Many different materials can be found in subterranean formations and thus the composition of the fine particulates may vary widely. In general, fines may include quartz and other minerals, clays, siliceous materials such as sand, etc. The methods and compositions herein described find particular use in treating sandstone formations, e.g. sand particles.

As used herein, the term "residual matrix strength" is a measure of the ability of a particulate matrix to hold together the individual particles under a given set of conditions (e.g. temperature, pressure, fluid flow, etc.). The residual matrix strength of a matrix may be quantified in several ways, e.g. in terms of the applied force, pressure, fluid velocity, etc. required to destroy or "break" the matrix.

Materials suitable for use in accordance with the invention are those which are capable of imparting a relatively weak residual matrix strength to the sand particles contained within a formation, for example a residual matrix strength of the order of 0.1 to 500 bar (e.g. about 0.1 bar), preferably 1 to 200 bar, more preferably 10 to 60 bar, yet more preferably about 50 bar. Preferred materials are capable of increasing the residual matrix strength by 20 to 100 bar, e.g. about 50 bar.

As used herein, the term "permeability" means the capacity of a porous medium (e.g. the particulate matrix) to transmit a fluid, i.e. the resistance to flow of a liquid through a porous material. Permeability is measured using Darcy's Law:

$$Q = k \cdot \Delta P \cdot A / \mu L$$

where
Q=flow rate ($cm^3/s$)
ΔP=pressure drop (atm) across a cylinder having a length L (cm) and a cross-sectional area A ($cm^2$)
μ=fluid viscosity (cp)
k=permeability (Darcy)

Preferably, the reduction in permeability of the formation following treatment in accordance with the invention will be less than 40%, preferably less than 30%, more preferably less than 20%, e.g. less than 10%. Yet more preferably, the formation will have substantially the same permeability both prior to and following treatment in accordance with the invention.

Particularly preferred for use in the invention are materials which increase the residual matrix strength of the sand particles by 20 to 1,000%, preferably 100 to 200% without decreasing the relative permeability of the formation by more than 50 to 1%, preferably 30 to 1%, e.g. 10 to 1%.

Particularly preferred materials for use in the method of the invention are those capable of increasing the residual matrix strength of the sand particles such that the % sand production (% of the total mass) in the test described in Example 1 presented herein is less than 20%, preferably without decreasing the relative permeability of the formation by more than 50 to 1%, preferably 30 to 1%, e.g. 10 to 10%.

Further preferred materials for use in the method of the invention are those capable of increasing the residual matrix strength of the sand particles such that break occurs in the test described in Example 3 presented herein at a confining pressure of at least 250 bar (e.g. at about 0.4 l/min), more preferably at least 270 bar, preferably without decreasing the relative permeability of the formation by more than 50 to 1%, preferably 38 to 1%.

Further preferred materials for use in the invention are those capable of imparting a residual matrix strength to the sand particles such that in the test described in Example 1 herein the treated sand particles can withstand a pressure drop of at least 10,000 mbar, preferably at least 15,000 mbar, without breaking. Particularly preferably, such materials do not decrease the relative permeability of the matrix by more than 50 to 10%, preferably 30 to 1%, e.g. 10 to 1%.

It is also preferred that the materials for use in the invention afford a matrix which is resilient, e.g. it has high compressive, tensile and bond strengths. Preferably, the particulate matrix should have sufficient resiliency to withstand the stress conditions resulting from high fluid pressures and/or temperatures inside the formation, e.g. during testing, perforating, fluid injection or fluid production. For example, the matrix should be able to withstand a pressure pulse of at least 10,000 mbar, preferably at least 50,000 mbar substantially without loss of its structure.

The amount of particulate fines and especially sand particles produced from any given rock formation on exposure to a fluid at a given velocity may be expressed as a percentage of the original mass of the formation. Materials suitable for use in accordance with the invention are those which are capable of minimising the production of particulate fines, and especially sand particles, and will generally maintain the level of production of particulates below 10%, e.g. below 8%, at a Darcy flow rate (Darcy velocity) of at least 0.3 cm/s. Materials which are able to keep sand production levels within the range of from 1 to 4%, e.g. 1-2%, at a Darcy velocity of at least 0.3 cm/s are particularly preferred.

The nature and concentration of the agents used in the invention is such that these impart a relatively small increase in the residual matrix strength of the sand particles. For example, it has been found that a rest force roughly equivalent to the capillary forces (capillary tension) in water wetted sand (approx. 1 psi) is sufficient to stop (or at least limit) the mobilization of fine particulates, and especially sand particles. A relatively small increase in the residual matrix strength of sand particles can in turn result in a considerable increase in the Maximum Sand Free Rate (MSR). This has a huge economic impact for those wells where the production rate is dependent on the MSR.

Materials for use in the invention are preferably dispersible or soluble in a hydrocarbon (e.g. a $C_{1-20}$ alkane). Still more preferably, the materials for use in the invention are also at least partially water soluble (e.g. water soluble). In some cases the material for use in the invention will be more soluble in hydrocarbon than in water. More preferably, however, the materials for use in the invention will be more soluble in water than in hydrocarbon. The materials for use in the invention may, for example, partition between hydrocarbon and water at a ratio in the range 5:95 to 90:10, more preferably 10:90 to 70:30, for example, about 40:60. The ability to partition in this way enables the material to be delivered to the formation in a hydrocarbon carrier (e.g. substantially without decomposition) whilst at the same time enabling it, if necessary, to undergo reaction on contact with connate water at the desired point of action.

Materials for use in the invention include organosilanes, for example organosilane hydrides, organosilane alkoxides and organosilane amines. Organosilane compounds have the advantage that they are typically oil-soluble and react with water. These are also biodegradable and environmentally acceptable (e.g. for DYNASYLAN AMEO: $LC_{50}$ fish=934 mg/l; $EC_{50}$ daphnia 331 mg/l; $IC_{50}$ algae=603 mg/l, biodegradability=67%, for DYNASYLAN bis-AMEO: $LC_{50}$ fish>200 mg/l; $EC_{50}$ daphnia >200 mg/l; $IC_{50}$ algae=125 mg/l, biodegradability=64.5 as tested according to OECD 306). Organosilanes for use in the invention preferably have a biodegradability of at least 60%. Whilst not wishing to be bound by theory, it is believed that organosilane compounds react with water and hydrolyse. The resulting chemicals then react with siliceous surfaces in the formation (e.g. the surface of silica sand), coat any sand particles, bind them in place by the formation of bridges and restrict their movement. The advantage of bifunctional organosilanes is their ability to bind two particles together.

Particularly Preferred Organosilane Compounds include those having at least one hydrolysable bond. By a "hydrolysable bond" is meant a bond that is capable of being cleaved on reaction with water. Preferably the hydrolysable bond will be attached to a silicon atom. In other words, the hydrolysable bond is preferably between Si and a second atom/group in the molecule. Still more preferably the hydrolysable bond is one which may hydrolyse to produce a silanol (i.e. —Si—OH).

Whilst not wishing to be bound by theory, it is believed that the hydrolysis of an organosilane to produce a silanol may be critical to the success of the method herein described. More specifically it is thought that the organosilane, upon contact with connate or residual water in the formation, hydrolyses to form a silanol.

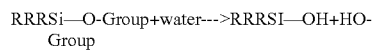

Figure 2:
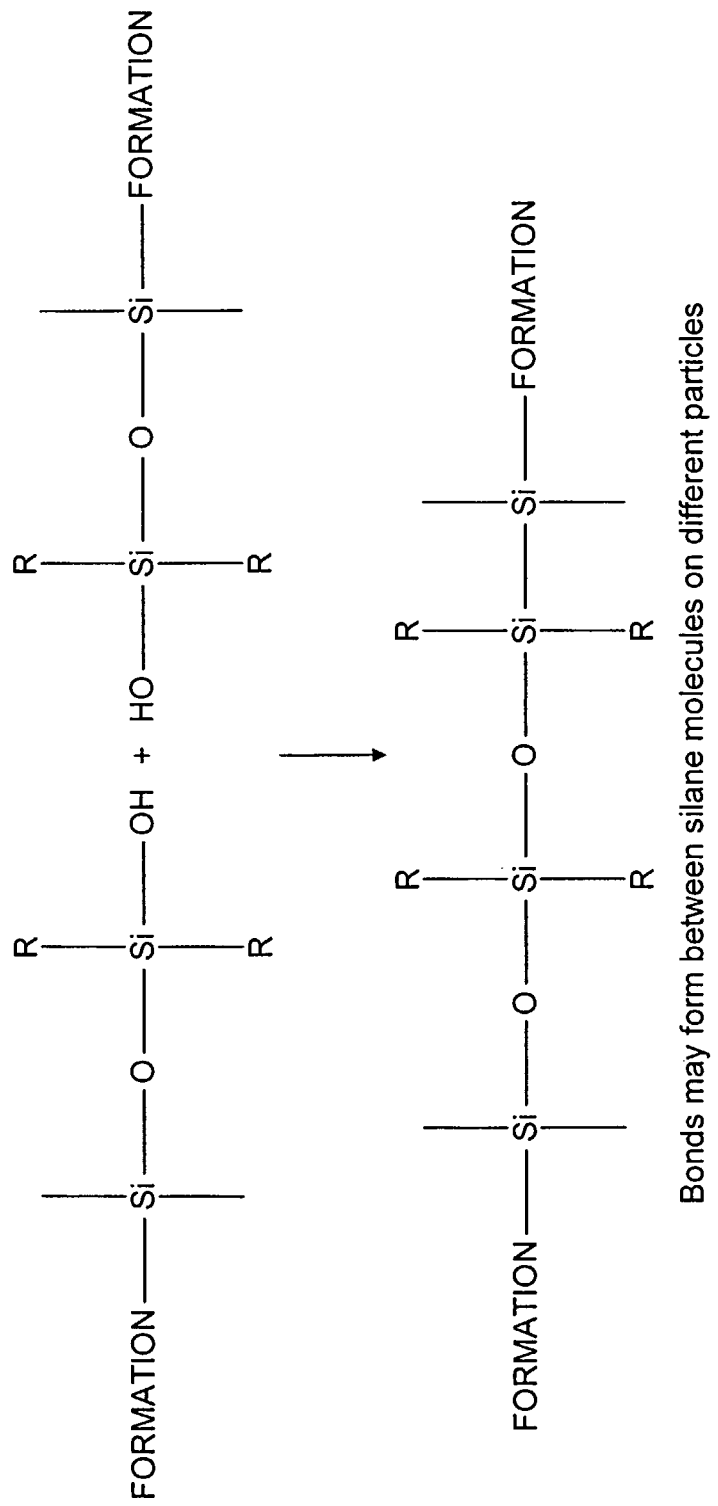
FIG. 2 shows the chemical reaction between different organosilane molecules bound to the same particle and/or different particles.

This silanol is then believed to react with active sites (e.g. SiOH bonds) on the surface of the formation (i.e. sand particles) and/or condense with another silanol molecule by forming —Si—O—Si— bonds (see FIG. 1). Whilst the former reaction serves to covalently bond the organosilane to particles (e.g. sand particles) comprising the formation, the latter enables the organosilanes to covalently bond to each other. Bonds may form between different organosilane molecules bound to the same particle and/or different particles (see FIG. 2). The organosilane therefore acts as a "glue" or "bridge" to bind or hold together the particles comprising the formation, thereby reducing or eliminating their movement when fluid flows through the formation. Bridging will typically occur between surfaces of particles which are separated by up to 30 bond lengths, preferably 15-20 bond lengths, e.g. on grain-to-grain contact. In this way, the residual matrix strength of the formation is increased.

The amount by which the residual matrix strength is increased may depend on the number of bonds the organosilane forms with the sand particles and/or the extent to which reaction occurs between different organosilane compounds, especially those bound to different particles. This, in turn, at least partially depends on how many silanol groups can be formed per molecule.

Preferred organosilane compounds for use in the invention comprise 1 to 12 hydrolysable bonds, more preferably 3 to 9 hydrolysable bonds, still more preferably about 6 hydrolysable bonds. Such compounds possessing hydrolysable bonds may well be able to self-condense and/or polymerise after hydrolysis of one or more of the hydrolysable bonds. The afore-mentioned preferred numbers of hydrolysable bonds therefore relates to the number present in the monomeric form of the compound (i.e. one which has not undergone oligomerisation or polymerisation). For example, aminotriethoxysilane contains 3 hydrolysable bonds (i.e. 3×Si—OEt) and bis-(triethoxysilylpropyl)amine contains 6 hydrolysable bonds (i.e. 6×Si—OEt). In the organosilane compounds for use in the invention, the hydrolysable bonds present may be different, but more preferably are the same.

In preferred organosilane compounds for use in the invention at least one hydrolysable bond comprises part of a terminal group. More preferably, all of the hydrolysable bonds comprise part of a terminal group. By a "terminal group" is meant a group which is located at one end of the molecule.

This is in contrast to a side group or pendant group which is attached to another part of the molecule. For example, in the compound aminotriethoxysilane, the amino group and the —Si(OEt)₃ groups are terminal groups. In contrast in the compound bis-(triethoxysilylpropyl)amine the —Si (OEt)₃ groups are terminal groups, whereas the amine group is not.

In particularly preferred compounds for use in the invention all bonds other than the afore-mentioned hydrolysable bonds, are stable to the conditions to which it is exposed in use (e.g. stable to hydrolysis in sea water). Preferably the remaining bonds in the molecule are carbon-carbon, carbon-hydrogen, silicon-carbon, nitrogen-carbon, oxygen-carbon and/or nitrogen-hydrogen bonds.

Preferred organosilane compounds may also include an amine group. The presence of an amine group may result in stronger adhesion of the organosilane to the particles of the formation and/or increase the stability of the organosilane to high temperatures and/or pressures. This may be due to the fact that the amine group may form further bonds (e.g. covalent, hydrogen and/or ionic bonds) between the organosilane and the formation and/or other organosilanes. Preferably the amine is a primary amine (i.e. —NH₂), still more preferably a secondary amine (i.e. —NH—).

Particularly preferred are those organosilane compounds which include more than one functional group, e.g. bifunctional organosilanes, or those compounds which are capable of self-polymerisation to produce bifunctional molecules. By "bifunctional organosilane" is meant an organosilane comprising two separate Si atoms, each of which forms part of at least one hydrolysable bond. Bifunctional organosilanes therefore advantageously afford, upon contact with water, at least two separate —Si—OH groups, which may each undergo any of the above-described reactions either with the particles present in a formation and/or another organosilane. Bifunctional organosilanes therefore increase the degree of bonding which occurs between different organosilanes, especially those bound to different particles in the formation. Bifunctional organosilanes containing both alkoxide and amine groups are particularly preferred.

Monofunctional organosilanes are also useful in the method of the invention. By monofunctional organosilane is meant an organosilane comprising one Si atom that forms part of at least one hydrolysable bond. In contrast to bifunctional organosilanes, monofunctional organosilanes tend to allow for less bonding to occur between different organosilanes, particularly those bound to different particles in the formation. Monofunctional organosilanes containing an amine group are particularly preferred.

It is particularly preferred in the method of the invention to use a mixture of a bifunctional and a monofunctional organosilane. For instance, the mixture may comprise a bifunctional to monofunctional organosilane ratio of 75:25 to 25:75, more preferably 60:40 to 40:60, still more preferably about 50:50. These ratios of bifunctional to monofunctional organosilanes have, in many cases, been found to yield the desired balance of inter-compound condensation which may "glue" the particles together whilst at the same time providing adequate bonding to the siliceous surfaces of the formation (i.e. the sand particles). This, in turn, may be responsible for providing a consolidated mass having a gel-like structure. An advantage of the gel-like structure is that it may exhibit viscoelastic properties, i.e. it is not brittle.

Representative examples of organosilane compounds which are suitable for use in the invention are organosilane alkoxides, organosilane esters, organosilane oximes, organosilane halides and organosilane hydrides. These compounds contain at least one —Si—OR, —SiO(O)CR, —SiO—N=CRR', —SiX and —SiH group respectively (wherein R and R' may be $C_{1-20}$ alkyl and X is a halogen). Hydrolysis of compounds containing these groups yields, in addition to a silanol (i.e. —Si—OH), —ROH, —RC(O)OH, —R'RC=NOH, —HX and —H₂ respectively wherein R, R' and X are as hereinbefore defined.

Particularly preferred organosilane compounds are organosilane alkoxides and organosilane esters. These undergo hydrolysis to afford, in addition to a silanol, alkanols and acids respectively. Neither of these compounds generally cause problems (e.g. due to side reactions) in hydrocarbon wells. Preferred organosilane compounds for use in the invention comprise a group of the formula —Si—OR wherein R is $C_{1-20}$ alkyl, more preferably $C_{2-6}$ alkyl, e.g. ethyl. Other preferred organosilane compounds comprise a group of the formula Si—O(O)CR wherein R is $C_{1-20}$ alkyl, more preferably $C_{2-6}$ alkyl, e.g. methyl.

Organosilane compounds suitable for use in the invention include those compounds of formula I:

$$R^1R^2R^3S^1\text{—}R^4 \qquad (I)$$

(wherein $R^1$, $R^2$ and $R^3$ are each independently selected from hydrogen and organic radicals having from 1 to 50 carbon atoms; and $R^4$ is hydrogen, an organic radical having from 1 to 50 carbon atoms, or a group —OR⁵ in which R⁵ is an organic radical having from 1 to 50 carbon atoms;

with the proviso that at least one of $R^1$, $R^2$, $R^3$ and $R^4$ is other than hydrogen).

In the compounds of formula I, $R^1$-$R^5$ are preferably selected from optionally substituted alkyl, alkenyl, aryl and alkoxy groups having from 1 to 18, preferably from 1 to 10, e.g. 1 to 6, carbon atoms. Optional substituents which may be present include alkoxy (e.g. $C_{1-6}$ alkoxy), amino, silyl and silyloxy groups. The groups $R^1$—$R^5$ may further be interrupted by one or more heteroatoms, preferably by N, O or S, e.g. by a group —NR¹² where $R^{12}$ is H or $C_{1-6}$ alkyl.

Preferred for use in the invention are esters of organosilanes, i.e. those compounds of formula I in which $R^4$ is —OR⁵ where R⁵ is $C_{1-8}$ alkyl, e.g. $C_{1-6}$ alkyl.

Preferred compounds for use in the invention are those represented by formula (II):

$$R^{10}{}_b(RO)_{3-b}Si\text{—}R^{11}\text{—}R \qquad (II)$$

(wherein b is zero or a positive integer from 1 to 3, preferably 0 or 1, e.g. 0;

$R^{10}$ is a substituted or unsubstituted, preferably unsubstituted, alkyl group having from 1 to 6 carbon atoms, e.g. $C_1$ alkyl;

each R is independently a substituted or unsubstituted, preferably unsubstituted, alkyl group having from 1 to 18 carbon atoms, e.g. 1 to 6 carbons, or a —COR¹³ group wherein $R^{13}$ is an optionally substituted, preferably unsubstituted, $C_{1-18}$ alkyl, e.g. $C_{1-6}$ alkyl group; and $R^{11}$ is a substituted or unsubstituted alkyl group having from 1 to 40 carbon atoms (preferably 1 to 18 carbon atoms, e.g. 1 to 8 carbons) and which is optionally interrupted by one or more heteroatoms; or $R^{11}$ is a group of the formula —(CH₂)$_x$-A-(CH₂)$_y$—Si(OR)₃ in which A is an organic linking group or a group comprising an atom having a lone pair of electrons (e.g. a N, P or S atom); x is 0 or a positive integer, preferably from 1 to 10, more preferably 1 to 4, e.g. 2 or 3; y is 0 or a positive integer, preferably from 1 to 10, more preferably 1 to 4, e.g. 2 or 3; and R is as hereinbefore defined).

In preferred compounds of formula II, R is a $C_{1-6}$ alkyl group, more preferably a $C_{2-4}$ alkyl group, for example, methyl or ethyl. In particularly preferred compounds of formula II, each R is the same.

Preferred compounds of formula II are also those wherein $R^{11}$ is an unsubstituted alkyl group (e.g. $R^{11}$ may be propyl, butyl, pentyl, hexyl, heptyl, octyl, nonyl, decyl or dodecyl, especially preferably octyl).

In particularly preferred compounds of formula II, $R^{11}$ is a substituted or unsubstituted, preferably substituted, alkyl group (e.g. a substituted $C_{1-12}$ alkyl group). Preferred alkyl groups include propyl and butyl. Substituents which may be present include —$NH_2$, —NHR' and —NR'R" wherein R' and R" independently represent $C_{1-6}$ alkyl groups.

Particularly preferred organosilanes for use in the invention are those represented by formula III:

(wherein
each R is independently a substituted or unsubstituted, preferably unsubstituted, alkyl group having from 1 to 18 carbon atoms, e.g. 1 to 6 carbons, or a —$COR^{13}$ group wherein $R^{13}$ is an optionally substituted, preferably unsubstituted, $C_{1-18}$ alkyl, e.g. $C_{1-6}$ alkyl group;

A is an organic linking group or a group comprising an atom having a lone pair of electrons (e.g. a N, P or S atom);

x is 0 or a positive integer, preferably from 1 to 10, more preferably 1 to 4, e.g. 2 or 3; and y is 0 or a positive integer, preferably from 1 to 10, more preferably 1 to 4, e.g. 2 or 3).

In formulae II and III, the function of group A is as a linking moiety and its precise chemical nature is of lesser importance provided this function is fulfilled. Generally, however, it will comprise a chain 1 to 20 atoms long, preferably 1 to 10, especially 1 to 5. Examples of suitable linkers include both linear and branched alkylene chains which may be interrupted by heteroatoms such as nitrogen and oxygen.

In formulae II and III, x and y will generally be identical.

Unless otherwise specified, any alkyl, alkenyl or aryl group referred to herein may be mono- or poly-substituted and, with the exception of aryl, may be branched or unbranched.

In preferred compounds of formula III, $R^6$ is a $C_{1-6}$ alkyl group, more preferably a $C_{2-4}$ alkyl group, for example, methyl or ethyl. In particularly preferred compounds each R is the same.

Preferred compounds of formulae II and III are also those wherein A is a group comprising an atom having a lone pair of electrons, especially nitrogen. Preferably A will be a group —NH or —$NR^6$ where $R^6$ is $C_{1-6}$ alkyl.

Other preferred organosilanes for use in the invention are those represented by formula IV:

(wherein $R^7$ and $R^8$ are independently hydrogen or a substituted or unsubstituted, preferably unsubstituted, alkyl group having from 1 to 6 carbon atoms;

z is a positive integer, preferably from 1 to 20, more preferably 1 to 8, e.g. 3 or 8;

a is zero or a positive integer from 1 to 3, preferably 0 or 1 (e.g. 0);

$R^9$ is a substituted or unsubstituted, preferably unsubstituted, alkyl group having from 1 to 6 carbon atoms (e.g. $C_1$); and R is as hereinbefore defined in relation to formula III).

In preferred compounds of formula IV, at least one of $R^7$ and $R^8$ is hydrogen. More preferably both $R^7$ and $R^8$ are hydrogen. Further preferred compounds of formula IV are those wherein z is at least 2, still more preferably z is at least 3 (e.g. z is 3).

It is particularly preferred in the method of the invention to use a mixture of a compound of formula III and a compound of formula IV. For instance, the mixture may comprise a compound of formula III to a compound of formula IV in a ratio of 75:25 to 25:75, more preferably 60:40 to 40:60, still more preferably about 50:50.

Suitable organosilanes include 3-amino-propyltriethoxysilane, bis(triethoxysilylpropyl)amine, 3-(diethoxymethylsilyl)propylamine, trimethoxyoctylsilane, triethoxyoctylsilane, 4,4,15,15-tetraethoxy-3,16-dioxa-8,9,10,11-tetrathia-4,15-disilaoctadecane, and any combination thereof. Such compounds are available commercially, e.g. from Degussa (Hanau, Germany) under the tradenames DYNASYLAN 1126, DYNASYLAN 1122, DYNASYLAN 1506, DYNASYLAN OCTMO, DYNASYLAN OCTEO, DYNASYLAN AMEO and Si 69. A preferred combination of organosilanes for use in the invention is that comprising 3-aminopropyltriethoxysilane and bis(triethoxy silylpropyl)amine, preferably in a ratio of 75:25 to 25:75, more preferably 60:40 to 40:60, still more preferably about 50:50. A particularly preferred mixture is that sold under the tradename DYNASYLAN 1126.

Preferred esters of organosilanes include those containing amine groups. Whilst not wishing to be bound by theory the presence of the amine function appears to result in better adsorption of the organosilane to the fine particulates, e.g. sand grains. It is also believed that the presence of an amine group may contribute to the formation of a gel-like structure having viscoelastic properties.

The amount of material to be used will vary widely depending on factors such as the nature of the particular material used, the nature (e.g. permeability, temperature, etc.) of the rock formation and so on. The average particle/grain size of the sand particles will, for example, influence the strength of the matrix and thus the amount of chemical agent needed to prevent or reduce particle migration. In general, the amount of material used will be sufficient to maintain the rate of flow of liquid through the formation following treatment and appropriate amounts may readily be determined by those skilled in the art. Typically, the organosilane may be employed in an amount in the range of from 0.1 to 20% w/v, e.g. 1 to 5% w/v.

Preferably the amount of material to be used will be sufficient to coat a substantial portion of the sand particles comprising the formation. More preferably sufficient material is supplied to coat 10 to 70% of the particles, more preferably 20 to 60%, still more preferably 30-50%. This amount of material is capable of functioning as a bond or "bridge" between particles located in close proximity to one another. This contrasts with many conventional procedures which either seek to coat the entirety of particles comprising the formation or to solely treat other fines, e.g. clays, which are present within the structure of the formation. In general about 20 to 200 liters (e.g. about 50 to 150 liters), more preferably 30 to 100 liters of organosilane per $m^3$ of the formation will be employed.

Also suitable for use in the invention are enzyme systems. These comprise an enzyme and a substrate for the enzyme whereby the action of the enzyme on the substrate results in the precipitation or deposition of a material which effectively strengthens the binding of fine particulates. The material which is precipitated or deposited in the formation may be produced from a compound present in the rock formation prior to the introduction of the enzyme system. Alternatively, a suitable compound may be introduced into the well in addition to the enzyme and the substrate.

Enzymes suitable for use in the invention include those which remain active under the conditions (temperature, pressure, etc.) found in the rock formation to be treated. Typically, these will be water soluble. Preferably, the enzyme is a urease (EC 3.5.1.5). This may be isolated from any plant, animal, bacterial or fungal source. Optionally, this may be chemically modified provided it retains its desired catalytic activity. Examples of suitable ureases include thermophilic or thermostable ureases, e.g. those isolated from Jack bean. Ureases suitable for use in the invention are commercially available from Sigma. A particularly preferred urease is Urease *Canavalia ensiformis* (Jack bean) available from Sigma under the Product No. U1500.

Suitable enzyme-substrate combinations are ureases in combination with urea. Typically, these will be used together with an aqueous solution which on contact with the enzyme-substrate system is capable of forming a precipitate which binds fine particulates, and especially sand particles. A suitable solution for use with urease/urea is an aqueous solution containing a salt of Ca, e.g. calcium chloride. The action of urease on urea generates ammonia and $CO_2$. The $CO_2$ becomes trapped as bubbles of $CO_2$ which on contact with $CaCl_2$ generate $CaCO_3$. Although not wishing to be bound by theory it is believed the calcium carbonate is effective in cementing individual fines, and especially sand grains.

The amount of enzyme/enzyme substrate to be used will vary depending on factors such as the nature (e.g. permeability, temperature, etc.) of the rock formation and so on. In general, the amount of enzyme/enzyme substrate used will be sufficient to maintain the rate of flow of liquid through the formation following treatment and appropriate amounts may readily be determined by those skilled in the art. Typically, the enzyme system may be employed in an amount of from 5 to 300 I.U./$cm^3$, preferably less than 100 I.U./$cm^3$, e.g. less than 50 I.U./$cm^3$.

It is envisaged that treatment with a material as herein described could be at any stage in hydrocarbon production, i.e. before and/or after hydrocarbon production (i.e. extraction of oil or gas from the well) has begun. Preferably, the treatment will be prior to hydrocarbon production in order to mitigate against potential particulate migration and especially sand migration.

Treatment is conducted by injecting the composition through a well into the formation, generally employing pressures sufficient to penetrate the formation. Treatment times or period of shut-in will depend on a number of factors including the nature of the formation and the degree of consolidation required, the nature and concentration of the chemical employed, the depth of perforations, etc. Typical shut-in times may be determined by those skilled in the art and will generally range from 2 to 10 hours, preferably from 3 to 8 hours, e.g. about 4 to 6 hours.

Any conventional treatment methods may be used to supply the materials to the production well. Such methods will include bull-heading, coil tubing and zonal isolation with packers. Of these methods, bull-heading will generally be preferred. This is in contrast to prior art methods where treatment chemicals are generally placed at various points in the formation, e.g. placed by coiled tubing to spot this at the desired site. This is a more costly operation to perform. An advantage of bull-heading is that the whole well is treated and at relatively low cost. Bull-heading can be used for treatment of both vertical and horizontal wells and treatment can be effected during short production intervals. Suitable injection flow rates may be readily determined by those skilled in the art, however preferred flow rates may lie in the range 2500 to 3000 liters/min. In general, the injection flow rate will not be lower than about 500 liters/min.

Coiled tubing (CT) methods are less desirable for economic reasons but may nevertheless be successfully used to supply the materials to the well. Such methods are generally more appropriate for treating long horizontal sections of the well. Suitable CT methods include those conventionally used in the field, e.g. roto pulse method, concentric coiled tubing, etc.

In a particularly preferred aspect of the invention, the formation is treated with a pre-flush composition prior to treatment with a material capable of increasing the residual matrix strength of the formation. The purpose of a pre-flush composition is to invade substantially all of the pore space of the portion of the formation to be consolidated thereby removing a large proportion of the water naturally present therein. This then leaves essentially connate or residual water. The pre-flush also removes any water present in the equipment, pipelines etc involved in the system.

The use of a pre-flush composition is particularly preferred when the material used in the method of the invention is an organosilane. In this case, the pre-flush composition may function as a means to locate the organosilane on the particles comprising the formation, rather than in the pore spaces between the particles.

Whilst not wishing to be bound by any theory, it is believed that a pre-flush composition may be used to remove substantially all of the water present in the pore space of the formation, whilst at the same time leaving behind those water molecules which surround the formation particles (e.g. those which are bound thereto by hydrogen bonding). This water is sometimes referred to as the "residual water" or connate water. The effect of the pre-flush treatment is thus to provide a substantially dry formation (e.g. a formation comprising 1-25% water, (e.g. 1-100 water, preferably 2-5% water), typically 18-22% water.

When such a formation is subsequently treated with organosilane the only water present to cause hydrolysis is that surrounding the particles (e.g. the water molecules comprising the thin "film" or "shield" bound to the particles by hydrogen bonding). Hence hydrolysis substantially only occurs in close vicinity to the particles and the silanols produced invariably react with active sites (e.g. —Si—OH groups) on the particle surface and/or other silanols nearby. The overall effect is to provide a matrix wherein adjacent particles are "glued" together. In contrast, few (if any) silanols are produced in the pore spaces (as there are no water molecules there to cause hydrolysis) and few diffuse there from the surface of the particles before becoming bonded thereto. Thus little (if any) condensation/polymerisation reaction occurs in, or across, the pore space and it is essentially left open. This advantageously minimises any decrease in the permeability of the formation which could occur as a consequence of the consolidation treatment.

In selecting a pre-flush composition it is preferred to avoid a solvent which is substantially water soluble since such solvents will retain at least some of the water naturally present in the well. As a result, organosilane may hydrolyse and condense in the pore spaces before contacting the particles comprising the formation and potentially reduce permeability. Water immiscible solvents are therefore preferred for use in the pre-flush.

Preferred pre-flush compositions for use in the method of the invention are therefore substantially water insoluble (e.g. immiscible with water). Examples of suitable pre-flush compositions include crude oil, base oil, an aliphatic hydrocarbon (e.g. hexane), an aromatic hydrocarbon (e.g. benzene or toluene) or a petroleum distillation product or fraction (e.g. kerosene, naphthas or diesel fuel). Preferably the pre-flush composition comprises a petroleum distillation product, especially diesel fuel.

The pre-flush compositions for use in the invention should also be substantially dry, e.g. contain less than 100 water, preferably less than 5% water, more preferably less than 3% water, e.g. less than 1% water.

The volume of preflush composition used is typically 1000 liters per m$^3$ of formation to be treated. Generally the composition will be introduced (e.g. by pumping or injection) into the formation at a flow rate of 2500-3000 liters/min.

An after-flush or over-flush may also be optionally, but preferably, used in the method of the invention. An after-flush is typically done after injection of the material (e.g. the organosilane) capable of increasing the residual matrix strength of the formation. It serves to displace any unreacted material out of the tubing (e.g. out of the first 1-2 m of tubing) used to supply material to the well-bore. The same hydrocarbon liquids described above for use in the pre-flush composition may be used as an after-flush. Alternatively any convenient aqueous or non-aqueous liquid may be used.

Whilst an aqueous fluid may be used as an after-flush (e.g. water or acid), it is preferred that the after-flush is non-aqueous. In particular it is preferred that the after-flush does not comprise greater than 20% water, more preferably not greater than 10% water, still more preferably the after-flush comprises less than 5% water (e.g. less than 1% water). Still more preferably the after-flush does not comprise an acid.

Thus viewed from a further aspect the invention provides a method for the treatment of a subterranean formation which contains sand particles, said method comprising:

(i) pre-flushing said formation whereby to remove substantially all water from the pore space or voids of the formation;

(ii) contacting said formation with a material capable of increasing the residual matrix strength of the sand particles (e.g. an organosilane); and (iii) optionally after-flushing said formation.

A preferred method of the invention consists essentially of (e.g. consists of) steps (i), (ii) and (iii). Another preferred method consists essentially of (e.g. consists of) steps (i) and (ii) (i.e. no after-flush is used).

The treatment methods herein described are such that these may be repeated as necessary in order to prevent particle migration (e.g. to maintain sand-free production) at minimum cost. For example, treatment can be repeated at various intervals in order to maintain sand-free production throughout the lifetime of the well. Alternatively, if a SMART well concept is employed, treatment can be effected at each stage of opening of a new section or interval in the formation. With each opening the well bore may be treated as herein described prior to hydrocarbon production.

Other conventional well treatments such as stimulation treatment, hydraulic fracture treatment and scale reduction treatment may be used in conjunction with the method of the invention. These may precede or follow the method of the invention. Preferably, however, the well is ready to be put back onto production immediately after the method of the invention.

In a typical method of the invention a subterranean formation which contains sand particles is pre-flushed (e.g. with diesel) to remove substantially all water from the pore space in between the particles. The pre-flush is injected at a rate of 500-4000 liters, preferably 2500-3000 liters/min and may take 1-2 hours to complete. It is estimated that after this pre-flush less than 10% water is present in the formation to be treated. A material (e.g. an organosilane) capable of increasing the residual matrix strength is then injected in a hydrocarbon carrier. This carrier is usually substantially anhydrous. The material is injected at a rate of 2500-3000 liters/min and may take 1-2 hours to complete. Finally, an after-flush is usually injected into the formation before the well is optionally, but preferably, shut-in.

The preferred shut-in period is a function of the conditions in the well (e.g. temperature, pressure etc) which affect the rate at which consolidation occurs. Typically, however, the shut-in period will be from 3 to 24 hours, preferably 4 to 12 hours, for example, 6 to 9 hours.

The materials for use in the invention are preferably applied as a dispersion or solution in a liquid carrier. The liquid carrier may be aqueous or non-aqueous. Preferably, this will comprise a non-aqueous organic liquid, e.g. a hydrocarbon or hydrocarbon mixture, typically a $C_3$ to $C_{15}$ hydrocarbon, or oil, e.g. crude oil. Other suitable carrier liquids include aromatic hydrocarbons such as naphtha and diesel. Diesel is particularly preferred.

It is generally preferred to use a hydrocarbon carrier since these this will minimise the exposure of the treatment material (e.g. the organosilane) to water. This means that reaction (e.g. hydrolysis) during passage down into the well to the formation to be treated is minimised or prevented. Preferably the hydrocarbon carrier is substantially anhydrous. For example the hydrocarbon carrier preferably contains less than 5% water, more preferably less than 2% water, still more preferably less than 0.5% water, e.g. less than 0.1% water.

Suitable hydrocarbon carrier liquids include crude oil, base oil, an aliphatic hydrocarbon (e.g. hexane), an aromatic hydrocarbon (e.g. benzene or toluene) or a petroleum distillation product or fraction (e.g. kerosene, naphthas or diesel fuel). Preferably the hydrocarbon comprises a petroleum distillation product, especially diesel fuel.

The hydrocarbon carrier may also contain other additives known in the art for use in well treatment. Such additives may include surfactants, thickeners, diversion agents, pH buffers and catalysts. Preferably the hydrocarbon does not contain a catalyst. Still more preferably the hydrocarbon carrier consists essentially of a material capable of increasing the residual matrix strength (e.g. an organosilane) of sand particles in a formation.

Preferably, the concentration of the well treatment agent in the carrier liquid will be in the range of 0.05-50% w/v, preferably 0.1 to 30% w/v, more preferably 1 to 10% w/v, e.g. about 5% w/v. A higher concentration will generally be used for deeper perforations. Typically about 300-3000 liters of hydrocarbon carrier per m$^3$ of formation to be treated will be used.

The materials herein described may be used in treating hydrocarbon wells both prior to and during production of sand, i.e. for wells that already produce sand (post-failure) thereby effectively prolonging the lifetime of the well and those that potentially may produce sand (pre-failure). For example, potentially weak formations (e.g. those having a potential for sand production under the so-called TCS 2 test, i.e. at the borderline of the 217 Bar at 2 MPa confining pressure limit) could be treated in advance, i.e. on completion. In this way, the need for complex sand protection systems for completion of the well is avoided. Instead, much simpler and thus more cost effective sand protection systems can be used for completion, e.g. simple sand screens.

For existing wells where production is restricted by Maximum Sand Free rate, treatment in accordance with the invention enables the use of much higher flow rates. A higher draw down can therefore be employed resulting in an increase in the level of hydrocarbon production. In reservoirs where a depletion strategy might be used to permit more complete recovery of hydrocarbon, treated wells can tolerate a much higher differential pressure (i.e. higher draw down) without sand production.

The process of the invention is particularly effective in increasing tail-end production in more mature wells where the rate of production of hydrocarbon is limited by the Maximum Sand Free rate and high water cuts. Hitherto, such wells would tend to be shut down once the production rate reaches a cut-off level and thus becomes uneconomic. However, by treating these wells in accordance with the method herein described the formation is stabilised to the extent that this can tolerate a higher differential pressure without sanding problems. This enables a sufficient boost in the production rate of hydrocarbon (e.g. an increase of as little as 50-100 m$^3$ oil per day) that the well again becomes viable. In this way, the lifetime of the well can be prolonged by several years. By boosting the production rate from existing wells, the huge costs involved in opening a new formation are avoided, or at least delayed.

The methods herein described may be employed to stabilise any poorly consolidated or unconsolidated formation. These may comprise, in addition to sand particles, a broad range of "particulate fines" as herein defined. For example, these may comprise quartz or other minerals such as feldspars; muscovite; calcite; dolomite; barite; water-swellable clays such as montmorillonite, beidellite, nontronite, saponite, hectorite and sauconite; or non-water-swellable clays such as kaolinite and illite. Problems associated with the presence and movement of fines are most pronounced in sandstone-containing formations. Most preferably, the particulate fines herein described will thus comprise siliceous materials such as siliceous sand grains.

The wells themselves may be a naturally occurring consolidation or artificial consolidations. By artificial consolidation is meant a well which has been treated with other chemical agents, e.g. other consolidating agents. Wells containing materials having silica or siliceous surfaces are particularly suitable for application of the method of the invention.

The method of the invention is particularly suitable for use in formations comprising mainly sand. Preferred wells comprise greater than 75l sand, more preferably greater than 85% sand, still more preferably greater than 95% sand. By sand may be meant any material which consists essentially of $SiO_2$.

Particularly suitable wells for use of the invention are those which have relatively short production intervals. Generally both horizontal and vertical wells can be treated, though vertical wells are preferred. The temperature of a well to be treated by the method of the invention is preferably in the range 50-200° C.

The invention will now be described further with reference to the following non-limiting Examples:

EXAMPLE 1

Figure 3:
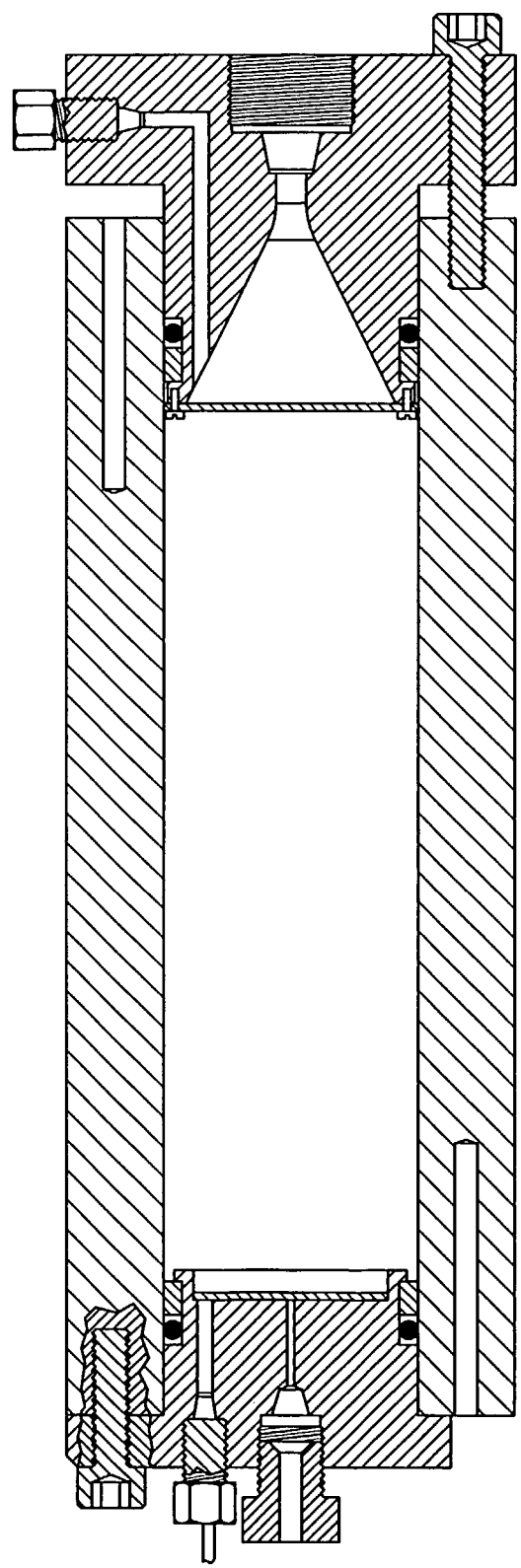
FIG. 3 shows a cylindrical sand pack holder.

Various chemicals were tested for their ability to consolidate sand using a cylindrical sand pack holder as illustrated in attached FIG. 3 having the following dimensions: 209 mm (length)×65 mm (diameter) and a total sand volume of 157 cm$^3$. The cylindrical sand pack holder can be split into two parts so that it is then possible to remove a partly consolidated sand pack, e.g. for strength testing, without destroying it. The sand pack holder was connected with differential pressure transducers and placed inside a heating cabinet. Two high-rate pumps were used to generate flow velocities high enough to generate sand production, whereas a pulse free pump was used for permeability measurements. A controller was connected to the two high-rate pumps that stepped up the rate according to a pre-programmed procedure.

Experimental Procedure:
1. The sand pack holder is filled with unconsolidated sand (standardised Baskarp sand).
2. Brine is injected into the sand under vacuum.
3. Permeability at SW=1 is measured. If oil soluble chemical:
4. Lamp oil is injected until $S_{wi}$ is established.
5. Permeability at $S_{wi}$ is measured.
6. Inject chemical and shut-in for a desired period of time and at a desired temperature.
7. The chemical is flushed out using brine (or lamp oil if using an oil soluble chemical).
8. Permeability after treatment at $S_w$=1 (or at $S_{wi}$ if using an oil soluble chemical) is measured. If oil soluble chemical:
9. Brine is injected until $S_{or}$ is established.
10. Sand production is measured using a pre-programmed procedure.

During sand production, the rate of fluid flow was stepped up from 0 to 100 ml/min, each rate step lasting for 30 seconds. The sand was produced into a beaker with overrun for the fluid. At the end of the experiment the sand was collected using a 0.45 μm filter. The sand was then dried at 50° C. and weighed.

Reference experiments were performed in the exact same manner, except that no chemical was injected into the sand pack. Instead, pure lamp oil or brine was injected depending on whether the chemical tested was oil- or water soluble.

Chemicals Tested:
DYNASYLAN 1126 (Degussa AG):
3-Aminopropyltriethoxysilane and bis(triethoxy silylpropyl) amine
DYNASYLAN 1122 (Degussa AG):
Bis(triethoxy silylpropyl)amine
DYNASYLAN 1506 (Degussa AG):
3-(Diethoxymethylsilyl)propylamine
DYNASYLAN OCTMO (Degussa AG):
Trimethoxyoctylsilane
DYNASYLAN OCTEO (Degussa AG):
Triethoxyoctylsilane
Si 69 (Degussa AG):
4,4,15,15-Tetraethoxy-3,16-dioxa-8,9,10,11-tetrathia-4,15-disilaoctadecane
UREA/UREASE (Urease used: U1500 from Sigma Chemicals; concentration: 50 I.U./cm$^3$)

Figure 4:
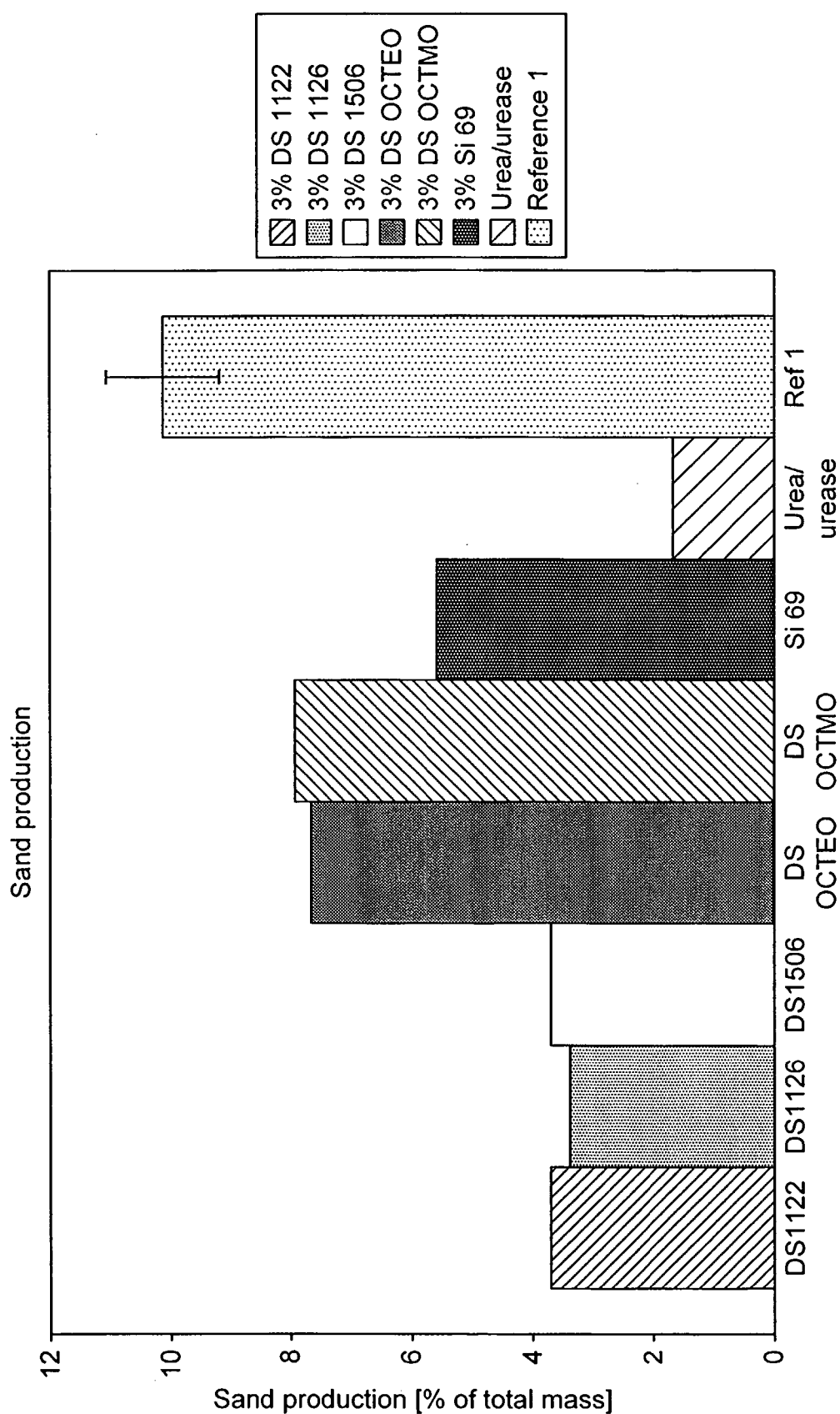
FIG. 4 shows the sand production (% of total mass of sand) during consolidation testing in a sand pack holder of the materials described in Example 1.
Figure 5:
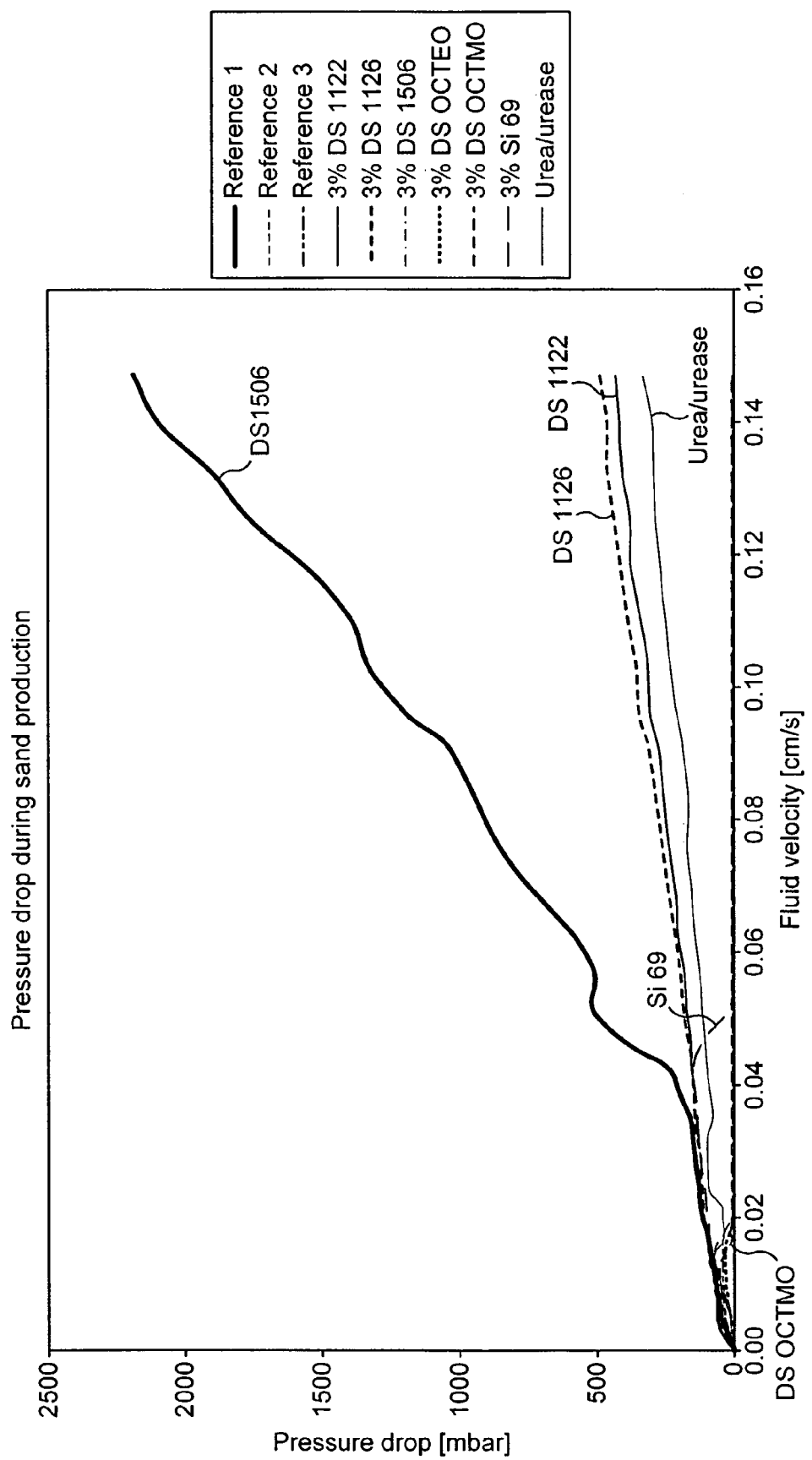
FIG. 5 shows the pressure drop during sand production for each of the materials described in Example 1.
Figure 6:
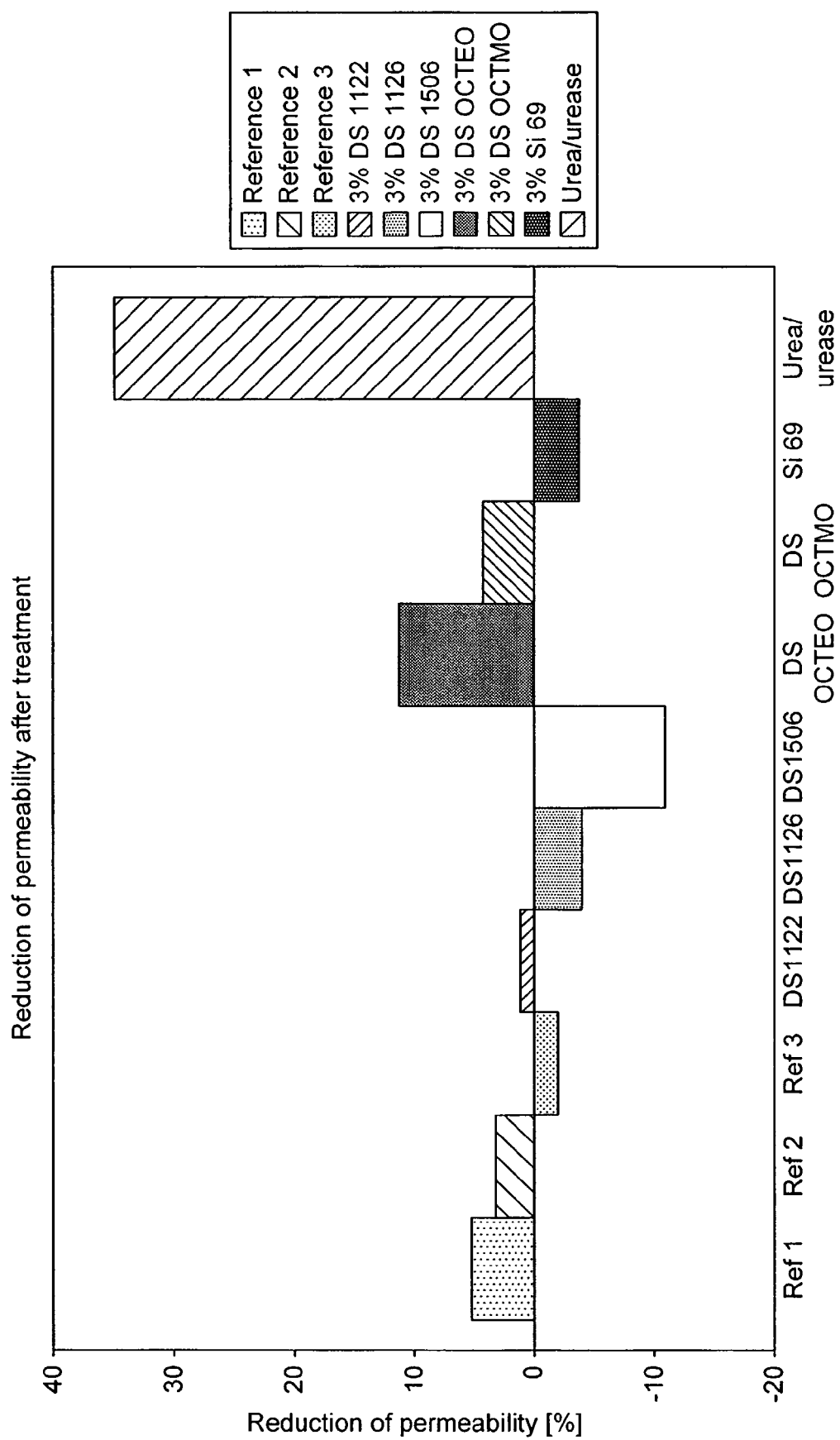
FIG. 6 shows the reduction of permeability of a sand pack after treatment with each of the materials described in Example 1.

Results:
In FIG. 4 the amount of sand produced is displayed as a percentage of the total mass of sand in the sand pack holder. FIG. 5 shows how the pressure drop across the sand pack varied during sand production for each chemical. FIG. 6 shows the percentage reduction in permeability for each chemical after treatment compared to before treatment.

Discussion:
The organosilanes have the advantage that they are oil-soluble and react with water. The urea/urease precipitates $CaCO_3$(s) in the matrix. If treatment with this latter system should fail, e.g. one gets a drastic reduction in permeability, one can easily remove the salt by use of an acid.

FIG. 4 shows that all the chemicals tested are capable of reducing sand production compared to the references. The urea/urease system has the best ability to consolidate sand, but it also has the greatest impact on permeability (see FIG. 6). The organo-silanes can be divided into two groups with regard their sand consolidation ability: DS 1122, DS 1126 and DS 1506 in one group, and DS OCTEO, DS OCTMO and Si 69 in the other. The first group has a very good performance. Whilst the second group reduces sand production, this is not as much as the first organosilane group or the urea/urease system.

For some experiments, the pressure drop during sand production kept rising during the whole experiment, see FIG. 5. Some experiments, however, demonstrated a sudden and drastic reduction in the pressure drop during sand production. This is caused by a complete breakdown of the sand matrix, i.e. a channel is formed through the whole sand pack in which the fluid is flowing freely. The chemicals that have the best ability to consolidate sand will not exhibit any breakdown-point during the sand production experiment.

EXAMPLE 2

The experiments described in Example 1 were repeated using various concentrations (3% and 5%) of DYNASYLAN 1126 (Degussa AG). Reference experiments were performed in the same manner except that lamp oil was injected into the sand pack holder instead of the organosilane mixture. The sand used in the tests was obtained from the Norne field ("Norne" sand).

Figure 7:
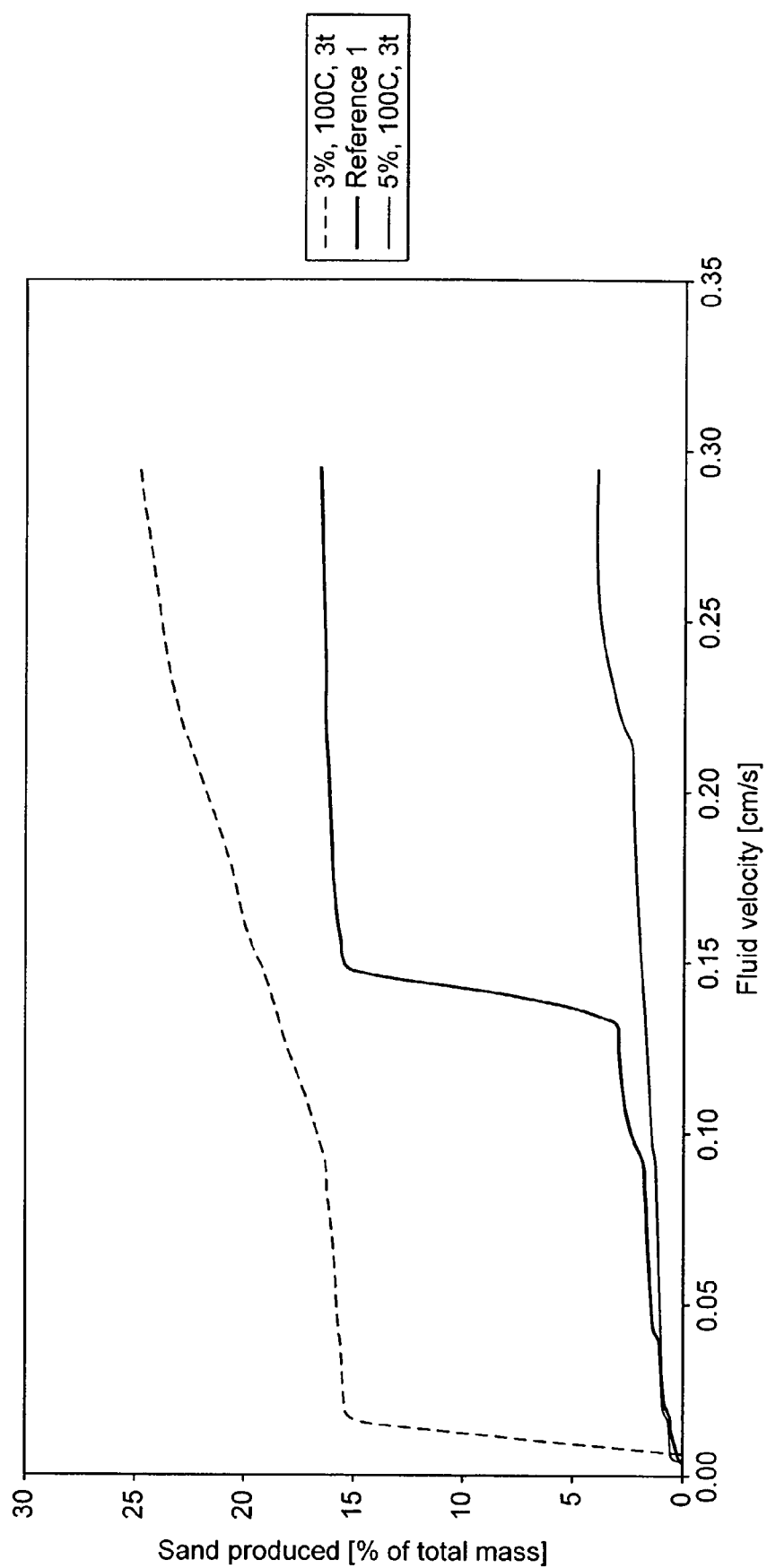
FIG. 7 shows the sand production (% of the total mass of sand) with increasing fluid velocity during consolidation testing in a sand pack holder of the material described in Example 2.
Figure 8:
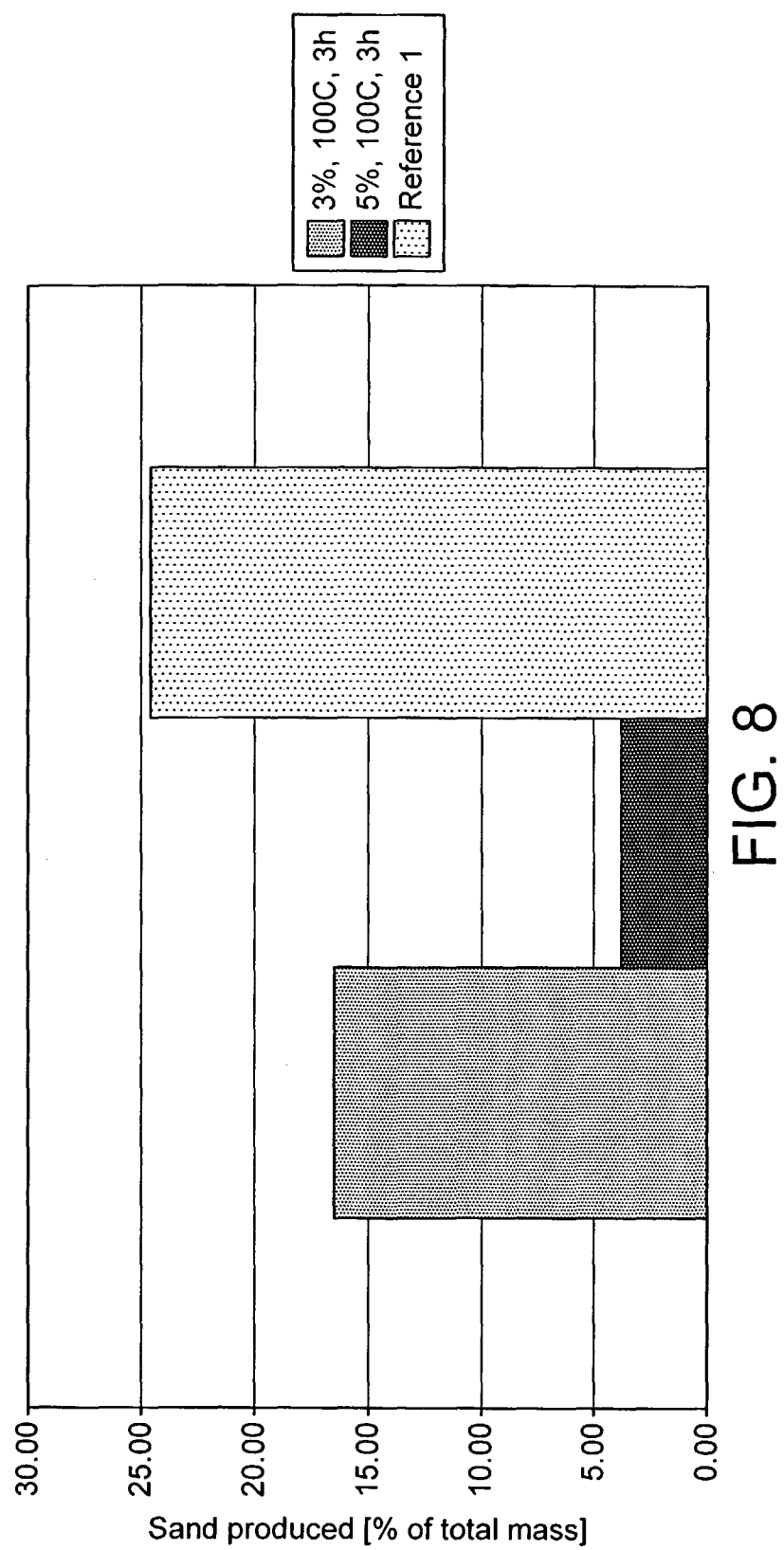
FIG. 8 shows the sand production (% of the total mass of sand) during consolidation testing in a sand pack holder of the materials described in Example 2.

FIG. 7 shows the sand production (% of the total mass of sand) with increasing fluid velocity. The reference sample (no chemical) fails almost immediately as evidenced by the rapid rise in sand production at low fluid velocities. This results from a complete breakdown of the sand matrix. The 3l DS 1126 sample is able to withstand fluid velocities up to about 0.14 cm/s before sand production levels are seen to rise to any appreciable extent. However, the sand matrix does not breakdown completely and the sand production levels out at about 15%. The 5% DS 1126 sample withstands velocities up to about 0.30 cm/s whilst maintaining sand production levels below 5%. In FIG. 8 the amount of sand produced is shown as a percentage of the total mass of sand in the sand pack holder for each of the three samples tested.

EXAMPLE 3

Hollow Cylinder Tests

Figure 9:
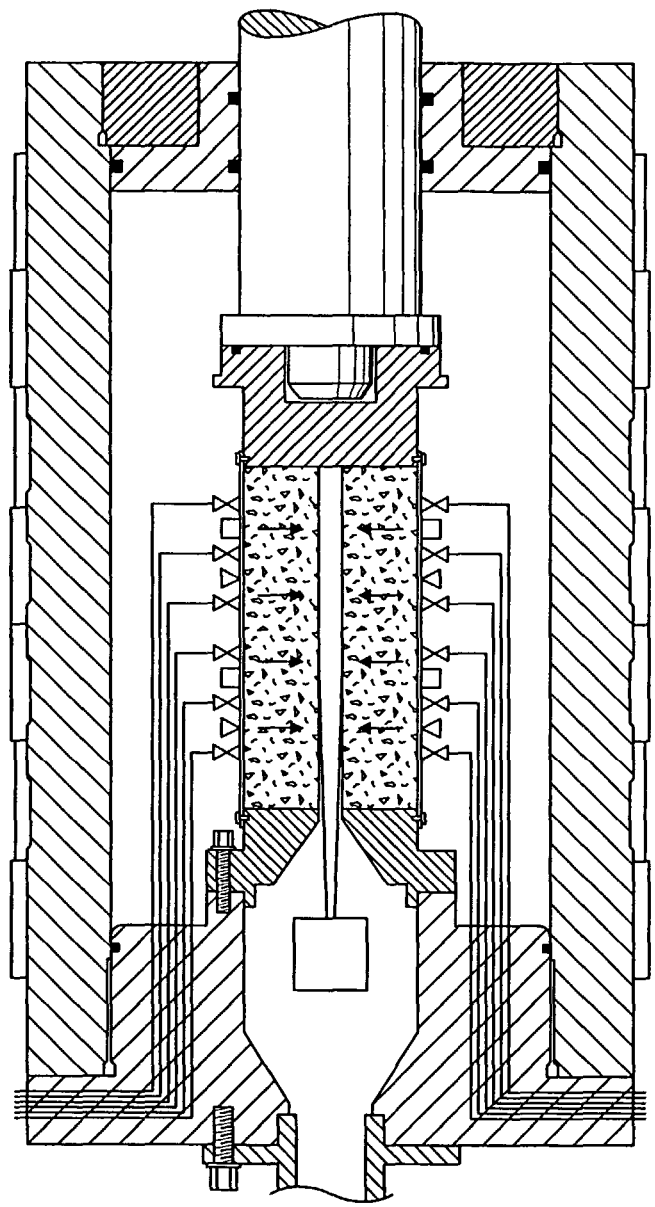
FIG. 9 shows the apparatus used as described in Example 3.

A measurement of the strength of a sand matrix is provided by a hollow cylinder test using the following procedure:
1. Install and connect up the apparatus shown in FIG. 9. External radial deformation is measured in two orthogonal directions. Also measured is the pressure around the core, the injection pressure, injection rate and amount of sand produced.
2. A nominal pressure around the core of 2 MPa is imposed and radial flow of fluid (0.3 liters/min) is started with lamp oil to ensure complete saturation (duration: 10 mins).
3. Pressure around the core is increased in a first step (rate: 4 MPa/time) and radial flow starts. At each pressure level the flow is conducted for approx. 5 mins at each of the following rates: 0.2 l/min, 0.3 l/min and 0.4 l/min.
4. Pressure around the core is increased in 1 MPa steps and flow repeated at each pressure level until the sample collapses.

The following results were obtained for various samples treated with DS 1126 at different concentrations and in different carrier fluids:

| Test Type | Pre-treatment Permeability Ko@Swi | Post-treatment Permeability Ko@Swi | Permeability Reduction | Break at confining pressure | Sand Production before break | Total Sand Production |
|---|---|---|---|---|---|---|
| Reference (diesel without DS 1126) | 387 mD* 1124 Kw@"So" | | | 245 bar @ 0.3 l/min | Quite a lot before break | 8.0 gr |
| 5 vol % DS 1126 (diesel as base fluid) | 390 md 901 Kw@"So" | 225 mD | 42% | 277 bar @ 0.4 l/min | 0.7 gr | 1.78 gr |
| 3 vol % DS 1126 (diesel as base fluid) | 264 mD 610 Kw@"So" | 167 mD | 36% | 304 bar @ 0.4 l/min Start at 275 bar | 0.3 gr | 1.2 gr |
| 3 vol % DS 1126 (Base oil as base fluid) | 266 mD 520 Kw@"So" | 50 mD | 81% | 258 bar @ 0.4 l/min Start at 258 bar @ 0.3 l/min | 0.8 gr | 2.4 gr |

The results show that use of DS 1126 (at 5 or 3 vol %) greatly reduces sand production. Advantageously this is also achieved without much reduction in the permeability of the formation.

EXAMPLE 4

Field Tests

Two wells at the Norne field have been successfully treated with DYNASYLAN 1126 in order to reduce sand production. Tests performed on Norne cores have shown that a reduction in permeability of the core of up to 32-42% (e.g. about 40%) following treatment with a mixture of 3-5 vol % DYNASYLAN 1126 in diesel can be tolerated whilst at the same time providing effective sand consolidation. Such a reduction in permeability reduces the PI (Production Index) of the well by 10-15%. However, since the production of the well is not limited by PI but rather by sand production levels, such a reduction in PI is acceptable.

Prior to pumping the diesel/DYNASYLAN 1126 mixture, a pre-flush of base oil was injected in order to displace free water in both the well and the formation. The main pill of diesel/DYNASYLAN 1126 was displaced into the formation by pumping a string volume base oil overflush. The well was then shut-in for 6-9 hours in order to allow the DYNASYLAN 1126 to react with the formation.

The following oil production rates before and after treatment with the diesel/DYNASYLAN 1126 mixture were observed:

| | Oil production Rate before Treatment (Sm³/day) | Oil Production Rate after Treatment (Sm³/day) |
|---|---|---|
| Well B-3H: | 1700 | 4000 |
| Well B-2H: | 2200 | 2900 |

The total field production potential in the B-3H well increased by 2300 Sm³ per day following treatment with DYNASYLAN 1126. Sand production was also dramatically reduced and virtually ceased.

EXAMPLE 5

Scratch Tests

A measurement of the strength of a sand matrix is provided by a scratch test wherein a needle is applied under an increasing force until the surface of the sand breaks (Schei, G., Larsen, I., Fjaer, E., 1999, SINTEF Petroleum Research Report No. 33.0710.00/02/99 "Scratch Testing as a Tool for Formation Strength Determination-Phase 2". The results are shown in the table below:

| Core | Scratch Test (MPa) |
|---|---|
| Ile Core (untreated) | 0.39 ± 0.05 |
| Ile Core (3 vol % DS1126) | 0.88 ± 0.11 |
| Ile Core (5 vol % DS1126) | 1.56 ± 0.11 |
| Garn Core (3 vol % DS1126) | 8.5 ± 1.2 |

The results show that use of DS 1126 (at 5 or 3 vol %) increases the strength of the sand matrix.

The invention claimed is:

1. A method for the treatment of a subterranean formation which contains sand particles, the method comprising contacting the formation with a compound capable of increasing the residual matrix strength of the sand particles in order to reduce or prevent their migration while minimizing any decrease in the permeability of the formation, wherein the compound has the formula III:

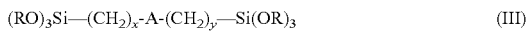

$$(RO)_3Si-(CH_2)_x-A-(CH_2)_y-Si(OR)_3 \qquad (III)$$

wherein
each R is independently a substituted or unsubstituted alkyl group having from 1 to 18 carbon atoms or a —COR$^{13}$ group wherein R$^{13}$ is a substituted or unsubstituted $C_{1-18}$ alkyl;
A is an organic linking group or a group comprising an atom having a lone pair of electrons;
x is 0 or a positive integer; and
y is 0 or a positive integer; and
wherein the compound is applied as a dispersion or solution in a hydrocarbon carrier that contains less than 2% water; and
wherein upon contacting, the compound increases the residual matrix strength of the sand particles.

2. The method of claim 1, wherein the hydrocarbon carrier contains less than 0.5% water.

3. The method of claim 1, wherein the hydrocarbon carrier contains less than 0.1% water.

4. The method of claim 1, wherein the dispersion or solution consists essentially of the hydrocarbon carrier and the compound capable of increasing the residual matrix strength of the sand particles.

5. The method of claim 1, wherein in formula III each R is independently a substituted or unsubstituted alkyl group having from 1 to 6 carbon atoms.

6. The method of claim 1, wherein in formula III A is an N, P, or S atom.

7. The method of claim 1, wherein in formula III x is 1 to 4.

8. The method of claim 1, wherein in formula III y is 1 to 4.

9. The method of claim 1, wherein the method further comprises contacting the formation with at least one other compound capable of increasing the residual matrix strength of the sand particles in order to reduce or prevent their migration while minimizing any decrease in the permeability of the formation, wherein the at least one other compound is trimethoxyoctylsilane, triethoxyoctylsilane, 4,4,15,15-tetraethoxy-3,16-dioxa-8,9,10,11-tetrathia-4,15-disilaoctadecane, or has the formula IV, or a combination thereof:

$$R^9{}_a(RO)_{3-a}Si-(CH_2)_z-NR^7R^8 \qquad (IV)$$

wherein R$^7$ and R$^8$ are independently hydrogen or a substituted or unsubstituted alkyl group having from 1 to 6 carbon atoms;
z is a positive integer;
a is zero or a positive integer from 1 to 3;
R$^9$ is a substituted or unsubstituted alkyl group having from 1 to 6 carbon atoms; and
each R is independently a substituted or unsubstituted alkyl group having from 1 to 18 carbon atoms or a —COR$^{13}$ wherein R$^{13}$ is a substituted or unsubstituted $C_{1-18}$ alkyl group
wherein the at least one other compound is applied with the dispersion or solution in the hydrocarbon carrier that contains less than 2% water; and
wherein upon contacting, the at least one other compound increases the residual matrix strength of the sand particles.

10. The method of claim 9, wherein the at least one other compound of formula (IV) is selected from the group consisting of 3-aminopropyltriethoxysilane and 3-(diethoxymethylsilyl)propylamine, or a combination thereof.

11. The method of claim 9, wherein in formula IV z is 1 to 8.

12. The method of claim 9, wherein in formula IV a is zero.

13. The method of claim 1, wherein the compound of formula (III) is bis(triethoxysilylpropyl)amine.

14. The method of claim 1, wherein the compound is capable of imparting a residual matrix strength to the sand particles in the range of 0.1 to 500 bar.

15. The method of claim 1, wherein the compound, on contact with the formation, effects a reduction in permeability of the formation of less than 40%.

16. The method of in claim 1, wherein the compound is capable of increasing the residual matrix strength of the sand particles by 20 to 1,000%, without decreasing the permeability of the formation by more than 50 to 1%.

17. The method of claim 1, further comprising, prior to contacting, pre-flushing the formation whereby to remove substantially all water from the pore space or voids of the formation.

18. The method of claim 17, further comprising after-flushing the formation.

19. A method of manufacturing hydrocarbon well treatment compositions comprising combining a carrier liquid with a compound of formula III:

$$(RO)_3Si\text{—}(CH_2)_x\text{-}A\text{-}(CH_2)_y\text{—}Si(OR)_3 \quad (III)$$

wherein
  each R is independently a substituted or unsubstituted alkyl group having from 1 to 18 carbon atoms or a —$COR^{13}$ group wherein $R^{13}$ is a substituted or unsubstituted $C_{1-18}$ alkyl;
  A is an organic linking group or a group comprising an atom having a lone pair of electrons;
  x is 0 or a positive integer; and
  y is 0 or a positive integer, and
wherein the carrier liquid contains less than 2% water.

20. A hydrocarbon well treatment composition comprising a carrier liquid containing a compound capable of increasing the residual matrix strength of sand particles contained within a subterranean formation in order to reduce or prevent their migration whilst minimizing any decrease in the permeability of the formation wherein the compound has the formula III:

$$(RO)_3Si\text{—}(CH_2)_x\text{-}A\text{-}(CH_2)_y\text{—}Si(OR)_3 \quad (III)$$

wherein
  each R is independently a substituted or unsubstituted alkyl group having from 1 to 18 carbon atoms or a —$COR^{13}$ group wherein $R^{13}$ is a substituted or unsubstituted $C_{1-18}$ alkyl;
  A is an organic linking group or a group comprising an atom having a lone pair of electrons;
  x is 0 or a positive integer; and
  y is 0 or a positive integer, and
wherein the carrier liquid contains less than 2% water.

* * * * *

UNITED STATES PATENT AND TRADEMARK OFFICE
CERTIFICATE OF CORRECTION

PATENT NO. : 8,596,358 B2  Page 1 of 1
APPLICATION NO. : 11/629729
DATED : December 3, 2013
INVENTOR(S) : Kotlar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twenty-second Day of September, 2015

Michelle K. Lee
*Director of the United States Patent and Trademark Office*